(12) United States Patent
D'Acunto et al.

(10) Patent No.: US 10,805,614 B2
(45) Date of Patent: Oct. 13, 2020

(54) PROCESSING SPHERICAL VIDEO DATA ON THE BASIS OF A REGION OF INTEREST

(71) Applicant: Koninklijke KPN N.V., Rotterdam (NL)

(72) Inventors: Lucia D'Acunto, Delft (NL); Emmanuel Thomas, Delft (NL); Mattijs Oskar Van Deventer, Leidschendam (NL); Simon Gunkel, Duivendrecht (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 0 days.

(21) Appl. No.: 16/338,936

(22) PCT Filed: Oct. 12, 2017

(86) PCT No.: PCT/EP2017/076115
§ 371 (c)(1),
(2) Date: Apr. 2, 2019

(87) PCT Pub. No.: WO2018/069466
PCT Pub. Date: Apr. 19, 2018

(65) Prior Publication Data
US 2019/0238861 A1 Aug. 1, 2019

(30) Foreign Application Priority Data
Oct. 12, 2016 (EP) .................................. 16002198

(51) Int. Cl.
*H04N 19/167* (2014.01)
*H04N 21/81* (2011.01)
(Continued)

(52) U.S. Cl.
CPC ......... *H04N 19/167* (2014.11); *H04L 65/607* (2013.01); *H04L 65/608* (2013.01);
(Continued)

(58) Field of Classification Search
CPC ....... H04N 21/21805; H04N 21/23439; H04N 21/26258; H04N 21/4728; H04N 21/816; H04N 21/8456; H04N 21/8586
See application file for complete search history.

(56) References Cited

U.S. PATENT DOCUMENTS 10,360,721 B2 * 7/2019 Lai ....................... H04N 13/239
2016/0165309 A1 6/2016 Van Brandenburg et al.
(Continued)

FOREIGN PATENT DOCUMENTS

EP 3028472 A1 6/2016
FR 2988964 A1 10/2013
(Continued)

OTHER PUBLICATIONS

D'Acunto et al., "MPD Signalling of 360 content properties for VR applications," International Organization for Standardistion, Coding of Moving Pictures and Audio, MPEG Meeting, Geneva, CH, 16 pages, May 2016.
(Continued)

Primary Examiner — Christopher S Kelley
Assistant Examiner — Boubacar Abdou Tchoussou
(74) Attorney, Agent, or Firm — Hamilton, Brook, Smith & Reynolds, P.C.

(57) ABSTRACT

A method for processing spherical video data is described comprising: receiving region of interest (ROI) information associated with a ROI in a spherical representation of video data, the ROI information including a spherical ROI coordinate associated with a position of the ROI; receiving a manifest file comprising one or more tile stream identifiers for identifying one or more tile streams, each tile stream comprising spherical video data of a tile on the spherical surface, each tile defining a subpart on the spherical surface, the manifest file further comprising spatial description infor-
(Continued)

mation for signaling the client apparatus information on the position of the tiles on the spherical surface; receiving projection information for signaling the client apparatus about the type of projection that is used for projection of the spherical video data onto a planar surface; and, receiving and/or generating boundary information for defining the boundary of the ROI on the basis of the spherical ROI coordinate, and, using the ROI area for selecting one or more tile streams on the basis of the spatial description information and the projection information, wherein each of the selected tile streams defines a tile on the sphere that overlaps with the ROI area.

17 Claims, 19 Drawing Sheets

(51) Int. Cl.
| | |
|---|---|
| *H04N 21/218* | (2011.01) |
| *H04N 21/4728* | (2011.01) |
| *H04N 21/262* | (2011.01) |
| *H04N 21/858* | (2011.01) |
| *H04N 21/845* | (2011.01) |
| *H04N 21/2343* | (2011.01) |
| *H04N 19/176* | (2014.01) |
| *H04N 19/23* | (2014.01) |
| *H04L 29/06* | (2006.01) |

(52) U.S. Cl.
CPC .......... *H04N 19/176* (2014.11); *H04N 19/23* (2014.11); *H04N 21/21805* (2013.01); *H04N 21/23439* (2013.01); *H04N 21/26258* (2013.01); *H04N 21/4728* (2013.01); *H04N 21/816* (2013.01); *H04N 21/8456* (2013.01); *H04N 21/8586* (2013.01)

(56) References Cited

U.S. PATENT DOCUMENTS

| | | | | |
|---|---|---|---|---|
| 2016/0353146 | A1* | 12/2016 | Weaver | H04N 21/2662 |
| 2017/0345205 | A1* | 11/2017 | Lai | H04N 13/232 |
| 2019/0174150 | A1 | 9/2019 | D'Acunto | |

FOREIGN PATENT DOCUMENTS

| | | |
|---|---|---|
| WO | WO 2015/008774 | 1/2015 |
| WO | 2015/014773 A1 | 2/2015 |
| WO | WO-2015014773 A1 * | 2/2015 ......... H04N 21/4728 |
| WO | WO 2015/060165 | 4/2015 |
| WO | 2015197818 A1 | 12/2015 |
| WO | WO 2015/197815 | 12/2015 |
| WO | 2016050283 A1 | 4/2016 |
| WO | 2017/202899 A1 | 11/2017 |

OTHER PUBLICATIONS

Fogg, "Essential metadata to support virtual reality in AVC and HEVC elementary video streams," Joint Collaborative Team on Video Coding (JCT-VC), 25th Meeting, Chengdu CN, 8 pages, Oct. 14-21, 2016.

PoLin, et al., "Signalling of VR spatial relationship in MPD," International Organization for Standardistion, Coding of Moving Pictures and Audio, MPEG Meeting, Chengdu, China, 15 pages, Oct. 2016.

PoLin, et al., "VR ROI indication," International Organization for Standardistion, Coding of Moving Pictures and Audio, MPEG Meeting, Chengdu, China, 6 pages, Oct. 2016.

Thomas, et al., "ROI coordinates track for VR director's cut signalling," International Organization for Standardistion, Coding of Moving Pictures and Audio, MPEG Meeting, San Jose, CA, 2 pages, Feb. 2016.

International Search Report and Written Opinion dated Nov. 28, 2017 for International Application No. PCT/EP2017/076115, entitled "Processing Spherical Video Data on the Basis of a Region of Interest".

Extended European Search Report dated Apr. 24, 2017 for European Application No. 16002198.6-1908.

Champel, M.L., "SRD Extensions for VR," ISO/IEC JTC1/SC29/WG11 MPEG 114/m38689, Geneva, Switzerland, May 2016.

International Standard ISO-IEC 23009-1, Information Technology—Dynamic Adaptive Streaming Over HTTP (DASH)—Part 1 Media Presentation Description and Segment Formats, Draft Third Edition (Dec. 7, 2015).

Movable Type Scripts, Calculate Distance, bearing and more between Latitude/Longitude Points (Sep. 12, 2016). Retrieved from internet via URL: http://www.movable-type.co.uk/scripts/latlong.html.

Wikipedia, Haversince Formula (Sep. 12, 2016).

D'Acunto, Lucia, et al. "Using MPEG DASH SRD for zoomable and navigable video." MMSys (2016).

Information technology—Dynamic adaptive streaming over HTTP (DASH)—Part 1: Media presentation description and segment formats, Amendment 4: Segment Independent SAP Signaling (SISSI), MPD chaining, MPD reset and other extensions, ISO/IEC JTC1/SC29/WG11 MPEG2016/m38605, Geneva, Switzerland, Jul. 29, 2016.

* cited by examiner

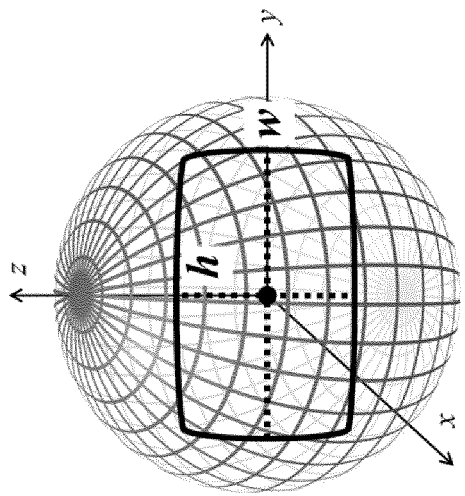
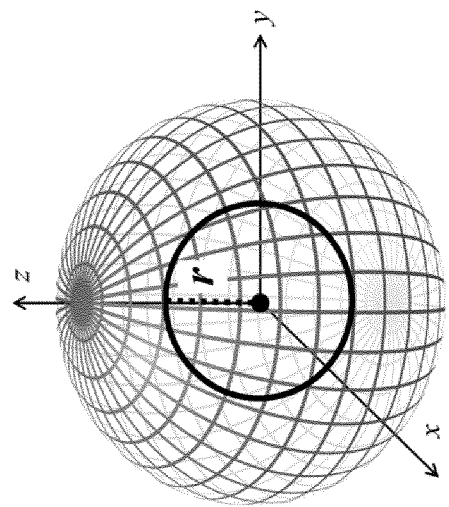
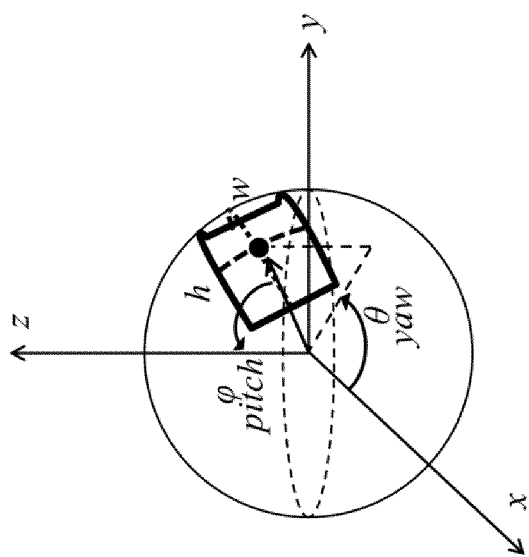
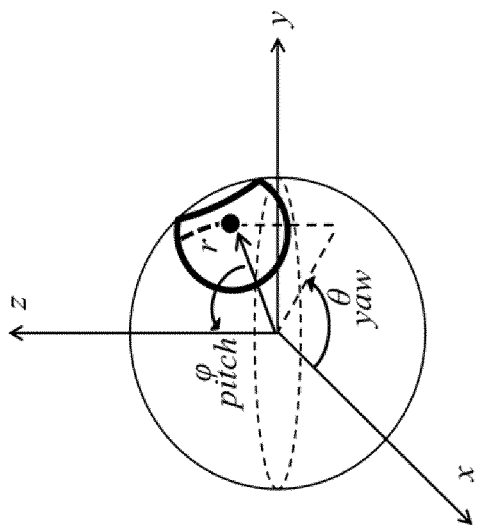
FIG. 3A
FIG. 3B

|  |  |  |
|---|---|---|
| AdaptationSet 1 | AdaptationSet 2 | AdaptationSet 3 |
| AdaptationSet 4 | AdaptationSet 5 | AdaptationSet 6 |
| AdaptationSet 7 | AdaptationSet 8 | AdaptationSet 9 |
| AdaptationSet 10 | AdaptationSet 11 | AdaptationSet 12 |

FIG. 8B

PROCESSING SPHERICAL VIDEO DATA ON THE BASIS OF A REGION OF INTEREST

This application is the U.S. National Stage of International Application No. PCT/EP2017/076115, filed Oct. 12, 2017, which designates the U.S., published in English, and claims priority under 35 U.S.C. § 119 or 365(c) to European Application No. 16002198.6, filed Oct. 12, 2016. The entire teachings of the above applications are incorporated herein by reference.

FIELD OF THE INVENTION

The invention relates to processing spherical video data on the basis of a region of interest, and, in particular, though not exclusively, to methods and systems for processing spherical video data on the basis of a region of interest, a data structure for enabling processing spherical video data on the basis of a region of interest and a computer program product for executing such methods.

BACKGROUND OF THE INVENTION

Advances in both camera and image processing technologies not only enable recording in ever higher resolutions, but also stitching the output of multiple cameras together. This way a set of cameras can together record in full 360 degrees at resolutions higher than 8K×4K. Representations of video data projected on a spherical surface such as omnidirectional video or 360-degree video, may be referred to as spherical video. Spherical video provides new user experiences such as virtual reality (VR) and augmented reality (AR) which are currently gaining momentum in the industry. Streaming high quality VR content however still poses challenges including the high-bandwidth requirements that are needed for streaming high-quality spherical video and representing the spherical content in a bitstream.

In practice, the available bandwidth will be a trade-off between efficiency and user experience. On one hand, there is the need to provide users the viewpoint they are interested in at a high quality and, at the same time, with minimal latency. This is an extremely difficult aim to meet because, although a viewpoint of a viewer watching spherical video is spatially limited, users may continuously change their viewpoint within the spherical stream, and the transition from one viewpoint to the other should be smooth.

For example, in some scenarios, or at some moments during the VR experience, the user may want (or be offered the possibility) to experience the video content at a different level of immersion and control. One level might be the "full immersion" or "active" mode, where the user wears a VR headset (or head mounted display device) and is immersed in in the VR world, in which she has all the degrees of freedom that are offered with the particular VR video content she is experiencing. Other levels of immersion and control might include a "theatre" mode, where the user wears a VR headset through which she is immersed in a "virtual theatre" containing a screen or a wall where the actual VR video content is displayed"; a "Augmented Reality (AR) TV" mode, where the user wears a AR headset and sees the VR video content as if it was projected onto her physical environment (while it is actually projected onto the glasses she wears); a "TV" mode, where the user watches the VR video content through her TV, and does not wear any VR or AR headsets.

For the more "passive" modes, such as the "theatre" and the "TV" modes, the ROI within the spherical video stream to be displayed to the user can be automatically selected by the content provider (the "director"), so to provide the user with a laid-back, enjoyable VR experience. Such passive modes may be referred to as "directed modes". In contrast, in full immersion mode the user may select parts of the spherical content by himself, e.g. by looking in different directions using a head mounted display device. This mode may hereafter by referred to as the "free mode". The user may decide to switch from the active free mode to a passive directed mode, and vice versa. These transitions may be allowed at any moment in time, or might only be permitted when changing among certain pre-defined scenes (e.g. between a battle scene and a dialog scene). In either case, the switches need to happen as seamlessly as possible (in time and space) in order to guarantee an acceptable user experience.

EP 3028472 A1 describes a method for seamlessly switching from a free navigation mode wherein a user may freely navigate in a tiled 2D video panorama to a directed viewing mode of a predetermined region of interest (ROI) inside this panorama. The position of the directed ROI is described by 2D coordinates defining a rectangle in the panorama such that the rendering device may seamlessly switch between the free mode and the directed mode.

Trying to implement the same functionality for spherical video data however is not a trivial exercise as spherical videos such as omnidirectional and 360-degree video, which are spherical in nature, are mapped onto one or more planes using a 2D projection before encoding the video data. The 2D projection is used so that the spherical video data can be used with modern video coding standards. Currently no standard way exists to represent a spherical video in a bitstream and different 2D projections (e.g. "equirectangular", "cylindrical", cubic", etc.) are possible so that interoperability becomes an issue. In addition, the indicated ROI would be distorted and possibly fragmented depending on the 2D projection that is used to represent the spherical content in the bitstream.

In the MPEG contribution ISO/IEC JTCC1/SC29/WG11 MPEG2016/m38605 with title "*MPD signalling of 360 content properties for VR applications*" of May 2016 a so-called spatial relationship description (SRD) for VR content is proposed. In this contribution it is suggested to describe the static position and the size of video tiles on the basis of a spherical representation. However, using this spherical representation for describing a moving ROI on a spherical surface would result in a ROI that has a shape that is dependent on the position of the ROI on the spherical surface, which makes the tile selection process difficult and inefficient.

Further, spherical video data are first projected onto a conventional rectangular 2D video frame format so that they can be processed using known video codecs. Different projections can be used and only after projection, the content is processed into tiles which can be encoded into a 2D representation of spherical content. This makes the selection of spherical content that may be represented on the basis of different projections a complex task.

Hence, from the above there is need in the art for improved methods and systems for processing spherical video data on the basis of a region of interest.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In a first aspect, the invention may relate to a method of processing an spherical video by a client device.

In an embodiment, the method may comprise receiving or generating region of interest (ROI) information associated with a ROI in a spherical representation of video data, the ROI having a boundary on a spherical surface, the spherical representation defining an image view of spherical video data on a spherical surface on the basis of a spherical coordinate system, the ROI information including a spherical ROI coordinate associated with a position of the ROI; receiving a manifest file comprising one or more tile stream identifiers for identifying one or more tile streams, each tile stream comprising transformed spherical video data of a tile on the spherical surface, the transformed spherical video data resulting from transforming the spherical video data, the transforming including at least a projection of the spherical video data onto a planar surface, preferably a rectangular planar surface; each tile defining a subpart on the spherical surface, the manifest file further comprising spatial description information for signaling the client apparatus information on the position of the tiles on the spherical surface; receiving projection information for signaling the client apparatus about the type of projection that is used for projection of the spherical video data onto a planar surface; and, receiving and/or generating boundary information for defining the boundary of the ROI on the basis of the spherical ROI coordinate, the boundary having a shape that is constant for each position on the spherical surface and defining a ROI area; and, using the ROI area for selecting one or more tile streams on the basis of the spatial description information and the projection information, wherein each of the selected tile streams defines a tile on the sphere that overlaps with the ROI area.

Hence, by using a spherical ROI that is described on the basis of one or more spherical ROI coordinates and that defines a ROI area and shape that is constant for each position on the spherical surface, spherical video associated with the ROI can be selected irrespective of the type of projection that is used for representing the spherical video data in the bitstream. Moreover, the fact that the ROI area and the shape of the ROI does not change, greatly simplifies the selection of tile streams that are needed to render spherical data associated with the ROI. Moreover, it allows the design of a ROI that substantially coincides with the field of view (FOV) of the video processing device, e.g. a head mounted device or the like.

The ROI information may relate to predetermined ROI coordinates of a "directed" video in which the director has selected a predetermined ROI of the spherical video data. This way, the ROI information may be used to seamlessly switch between a "directed" ROI selection mode and a "free" ROI selection mode.

In an embodiment, the type of projection may include an equirectangular projection, a cubic projection, a cylindrical projection or derivatives and/or combinations thereof.

In an embodiment, the boundary information may comprise one or more further ROI coordinates, the ROI coordinate and the one or more further ROI coordinates defining vertices of a spherical polygon, the boundary of the spherical polygon being defined by a line segment over the spherical surface between two vertices, the line segment being part of a great circle or a small circle of said sphere.

In an embodiment, the boundary information may comprise one or more further ROI coordinates, wherein the ROI coordinate defines a center of the ROI area and wherein the one or more further ROI coordinates define one or more points on the boundary of the ROI, preferably the boundary having a predetermined shape, including at least one of: a circle, square, ellipse, rectangular, a triangle.

In an embodiment, the boundary information may comprise a width and a height parameter for defining a rectangular shaped ROI, preferably the sides parallel to the width of the ROI are line segments of small-circles of the sphere and the sides parallel to the height of the ROI are line segments of big-circles of the sphere; or, the sides parallel to its width and the sides parallel to its height are line segments of big-circles of the sphere.

In an embodiment, the projection information is comprised in the manifest file. In an embodiment, the projection information may include a projection descriptor value for identifying the type of projection that is used for projection of the spherical video data onto the planar surface. In an embodiment, the manifest file may further comprise at least one ROI stream identifier, preferably an URL or URI, the ROI stream identifier identifying a data stream comprising a sequence of temporally ordered spherical ROI coordinates, the temporally ordered spherical ROI coordinates defining the position of the ROI as a function of time.

In an embodiment, the manifest file may further comprise ROI area information defining the boundary and/or shape of the ROI.

In an embodiment, the manifest file may further comprises ROI data format information for signaling the client apparatus about the data format of the ROI coordinates in the ROI stream, preferably the information referring to a 3D spherical coordinate sample entry.

In an embodiment, receiving the ROI information may include: receiving a data stream comprising spherical ROI coordinates, preferably temporally ordered spherical ROI coordinates, the ROI coordinates defining the position of the ROI as a function of time; and, optionally, the data stream comprising ROI area information defining the boundary and/or the shape of the ROI, In an embodiment, a spherical ROI coordinate may including at least a yaw and a pitch angle. In another embodiment, the ROI area information may include a width and a height parameters defining the width and the height of the ROI on the spherical surface.

In an embodiment, the client apparatus may use the projection information for selecting a tile selection algorithm, the tile section algorithm being configured to select one or more tiles that have overlap with the ROI.

In an embodiment, the selecting one or more tile streams may further comprise: using the projection information to transform the ROI area into a 2D projected ROI area on a flat plane; using the 2D projected ROI area in the selection of the one or more tile streams defining one or more tiles that overlap with the ROI area.

In an embodiment, generating region of interest (ROI) information may include:
receiving sensor information indicative of the head, eye and/or body movements of a user;
transforming the sensor information into a spherical ROI coordinate.

In an embodiment an adaptive streaming protocol, preferably the MPEG-DASH protocol, is used for processing and streaming the spherical video data, and, optionally, the ROI information.

In an aspect, the invention may relate to a client device for processing spherical video data comprising:
a computer readable storage medium having at least part of a program embodied therewith, the computer readable storage medium comprising a manifest file; and, a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a manifest file comprising one or more tile stream identifiers for identifying one or more tile streams, each tile stream comprising transformed spherical video data of a tile on the spherical surface, the transformed spherical video data resulting from transforming the spherical video data, the transforming including at least a projection of the spherical video data onto a planar surface; each tile defining a subpart on the spherical surface, the manifest file further comprising spatial description information for signaling the client apparatus information on the position of the tiles on the spherical surface; receiving projection information for signaling the client apparatus about the type of projection that is used for transforming spherical video data; receiving and/or generating boundary information for defining the boundary of the ROI on the basis of the spherical ROI coordinate, the boundary having a shape that is constant for each position on the spherical surface and defining a ROI area; and, using the ROI area for selecting one or more tile streams on the basis of the spatial description information and the projection information, wherein each of the selected tile streams defines a tile on the sphere that overlaps with the ROI area.

In a further aspect, the invention may relate to a non-transitory computer-readable storage media comprising a manifest file for a client device, said client device being configured to process spherical video data on the basis of the information in the manifest file, said manifest file comprising computer readable data, the computer readable data comprising: one or more stream identifiers for identifying one or more moving view video streams, a moving vide stream comprising spherical video data associated with a predetermined ROI; one or more ROI stream identifiers, preferably one or more URLs or URIs, a ROI stream identifier defining a data stream comprising spherical ROI coordinates, preferably temporally ordered spherical ROI coordinates, the spherical ROI coordinates defining the position of a predetermined ROI of a moving view video stream.

In an embodiment, the computer readable data may further comprise: ROI data format information for signaling the client apparatus about the data format of the ROI coordinates in the data stream, preferably the information referring to a spherical coordinate sample entry In an embodiment, the computer readable data may further comprise: one or more tile stream identifiers for identifying one or more tile streams, each tile stream comprising transformed spherical video data of a tile on the spherical surface, the transformed spherical video data resulting from transforming the spherical video data, the transforming including at least a projection of the spherical video data onto a planar surface; each tile defining a subpart on the spherical surface, the manifest file further comprising spatial description information for signaling the client apparatus information on the position of the tiles on the spherical surface.

The invention may also relate to a program product comprising software code portions configured for, when run in the memory of a computer, executing any of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 3A-3D illustrate various ROIs on a spherical surface for processing spherical video data according to various embodiments of the invention.

FIG. 8A-8C illustrates the structure of a manifest file according to an embodiment of the invention.

DETAILED DESCRIPTION

Figure 1:
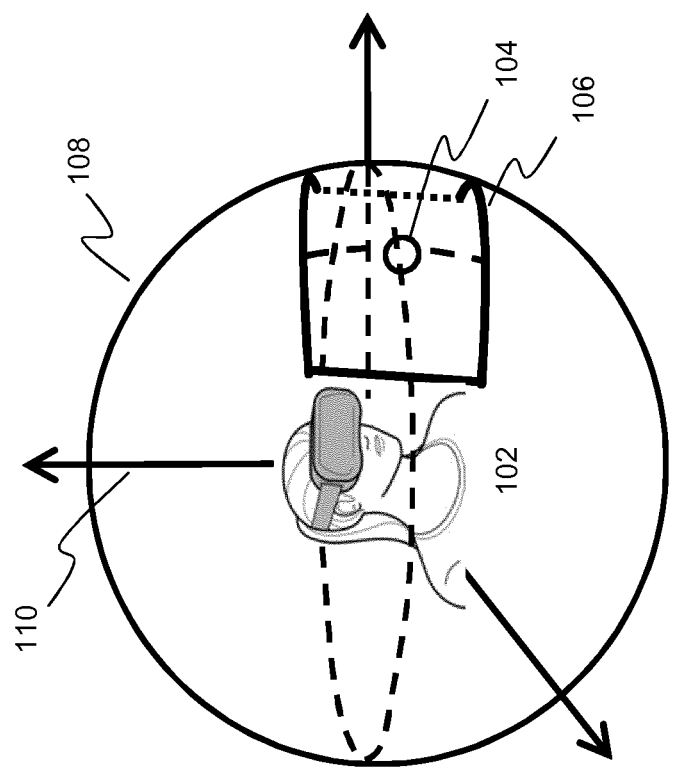
FIG. 1 depicts video processing device configured to render spherical content according to an embodiment of the invention.

FIG. 1 depicts video processing device configured to render spherical content according to an embodiment of the invention. In particular, FIG. 1 depicts a user wearing a video processing device, e.g. a head mounted device 102, which is configured to request and receive spherical content from the network and to render spherical content to a user 104. Here, spherical content relates to a spherical representation of video content onto a spherical surface 106 wherein the position of the video data on the spherical surface may be defined on the basis of 3D spherical coordinate system 108. The video processing devices are configured to process spherical video data and to render the spherical video data for display.

A non-limiting example of such video processing device is a head-mounted display (HMD) that is used for virtual reality and augment reality applications. An HMD may comprise one or more sensors for tracking head, eye and/or body movements of a user. The sensor information may be used to determine a viewpoint 110, i.e. a direction in 3D space in which the user of the video processing device is looking towards the spherical surface. A viewpoint may be expressed on the basis of the spherical coordinate system. A HMD is further characterized by a field of view (FOV) 112, i.e. an area defining the part of the spherical video the HMD is able to display for a particular viewpoint and a given moment in time. The FOV may be hereafter referred to as a region of interest (ROI) on the spherical surface.

The video processing device may be configured to render a different spherical representations of content. For example, in a first mode, it may render a first spherical representation of video content, wherein a user may freely select spherical video by moving the ROI over the spherical surface. The ROI may be moved by moving the video processing device by tracking head, eye and/or body movements of a user. In order to avoid that all spherical data need to be streamed to the video processing device, only the spherical video data that coincides with the position of the ROI on the sphere is selected and retrieved by the video processing device for rendering. To that end, the first spherical representation of the content may include different streams comprising video data of different spatial parts (subregions) of the surface of the sphere. Content may be selected by determining content of subregions that coincide with the ROI on the sphere. This way, the user is able to freely watch the spherical video data without the need of high bandwidth.

In a second mode, the video processing device may be configured to render a second spherical representation of video content. In this mode, a predetermined ROI of the spherical video data is preselected by a director and presented to the user. In this mode, the ROI is preselected and cannot be changed by the user. The video processing device may seamlessly switch between the first mode and the second mode on the basis of ROI coordinates which may be transmitted with the video data of the second spherical representation (the director's cut) to the video processing device. The invention enables switching between the first and second mode in an seamless way.

Figure 2:
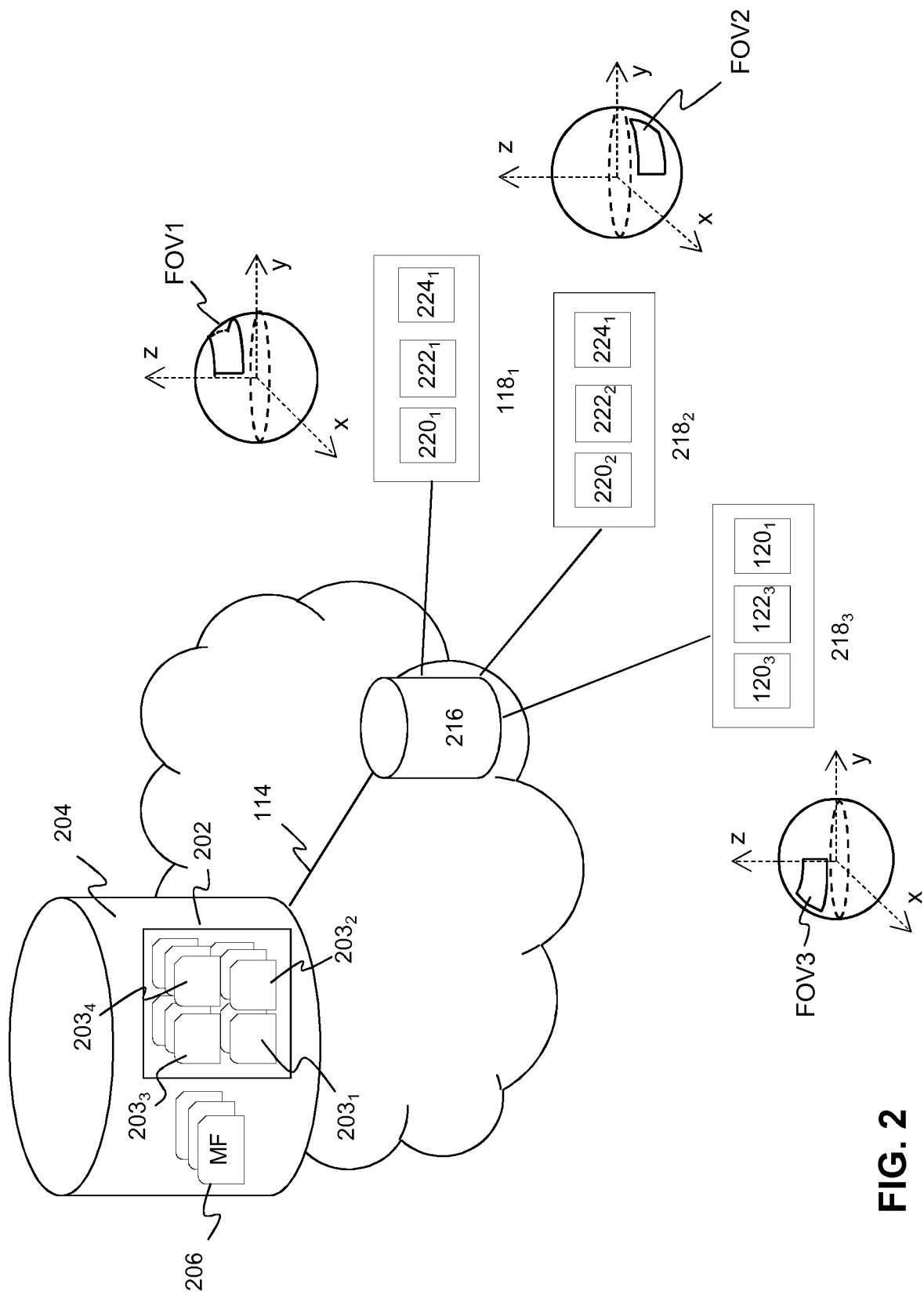
FIG. 2 depicts schematics of a video streaming system for spherical video according to an embodiment of the invention.

FIG. 2 depicts schematics of a video streaming system for spherical video according to an embodiment of the invention. In particular, FIG. 2 depicts a video streaming system 200 comprising one or more media sources 204, e.g. one or more video servers, configured for storing tiled spherical video data 202 on the basis of a predetermined data format.

Tiled spherical content may be stored as individual tile stream files $203_{1-4}$ wherein the video frames of a tile stream represent a subregion (a tile) of video frames that represent a two dimensional projection (a 2D mapping) of spherical video content onto a rectangular plane. Metadata associated with the tiled spherical content, e.g. tile stream identifiers (e.g. URLs or URIs) and the spatial relation between the different subregions (tiles) of different tile streams may be stored in a so-called manifest file 206. The concept of tiled content and tiled spherical content is described hereunder in more detail.

The one or more media sources are adapted for streaming the video data on the basis of a streaming protocol to video processing devices $218_{1-3}$ that are capable of processing spherical video (hereafter referred to in short as video processing devices). A media source may be part of a content delivery network (CDN) that is configured for efficient delivery of media data to a large number of video processing devices.

Each of the video processing devices may comprise a client device $220_{1-3}$ configured for requesting spherical content from the network, in particular network nodes such as video servers 204 and/or video caches 216. The video processing devices are further configured for receiving requested video data and for buffering the media data for input to a media engine $222_{1-3}$. The media video may comprise one or more processors, e.g. graphical processing units (GPUs), that can execute one or more decoding instances for decoding the media data into video frames.

During content generation, the spherical video data may be generated on the basis of a predetermined 2D mapping, e.g. an equirectangular projection. Hence, the video frames of the mapped spherical video comprise pixels in a rectangular frame that may represent an equirectangular projection of the spherical video data. These video frames may be subjected to a tiling process wherein a video frame is spatially divided in so-called video tiles (or in short tiles). The tiling process may include cropping video data (pixels) of an area that corresponds to a tile out of a video frame, encoded the cropped video data and stored the encoded video data as a video file. Repeating this process for different tiles results in a set of video files which can be separately accessed and streamed to a client device. A content processing device may comprise a client for requesting one or more tile streams, one or more decoders for decoding the video data of the different tile streams; and, a rendering engine for stitching the video frames together into a single video frame.

Alternatively, in some embodiments, the video frames of the 2D projection of the spherical video data may be encoded on the basis of a codec that supports spatial tiling. For example, the HEVC standard supports HEVC tiles wherein the video frames are spatially divided in a grid of tiles. These HEVC tiles are encoded such that each of the tiles can be processed by a different core of a multi-core microprocessor. The media data associated with an HEVC tile may be encoded such that they do not have any spatial decoding dependency on the media data of other tiles of the same video frame. Further, the media data associated with a tile are encoded such that they do not have any temporal decoding dependency on the media data of other tiles of earlier or future video frames. In that case, the video data of each HEVC tile may be stored as tile tracks on a media source 104. These tile tracks may have a data container format based on ISO/IEC 14496-12 ISO Base Media File Format (ISOBMFF) or ISO/IEC 14496-15 Carriage of NAL unit structured video in the ISO Base Media File Format. In that case, the content processing device should comprise an HEVC client that supports tiles which can decode the requested tile streams into a single video frame.

Different transport protocols may be used to transmit an encoded bitstream comprising 2D projected spherical video data to a client device. For example, in an embodiment, an HTTP adaptive streaming (HAS) protocol may be used for delivering a tile stream to a client device. In that case, the sequence of video frames in the tile stream may be temporality divided in temporal segments, typically comprising 2-10 seconds media data. Such temporal segment may be stored as a media file on a storage medium. In an embodiment, a temporal segment may start with media data that have no temporal coding dependencies on other frames in the temporal segment or other temporal segments, e.g. an I frame or an equivalent thereof, so that the decoder can directly start decoding media data in the HAS segment. Optionally, an initialisation segment may be provided along with the media segments with the purpose of initialising the decoder with parameters pertaining the media stream, e.g. spatial resolution, frame rate, codec profile and level, etc. . . . .

The client device may be configured to select a set of tiles associated with a viewpoint of a video processing device. In an embodiment, the client device may perform this selection on the basis of information in a so-called manifest file 206, i.e. one or more data structures comprising metadata for the client device in order to select and request tile streams from the network.

A manifest file may comprise stream identifiers, e.g. URLs, or information for determining such stream identifiers. The stream identifiers may include one or more tile stream identifiers. The manifest file may further comprise spatial relationship information for signalling a client device on the spatial relationship that exists between the tiles. In an embodiment, a tile stream identifier may be associated with tile position information, i.e. information for signalling a client device about the position of a tile in a tiled video frame of a tile stream. In order to allow fast selection of tiles, the tile position information may be represented in spherical coordinates.

A manifest file may further comprise location information regarding one or more network nodes, e.g. one or more URLs and/or network addresses of network nodes. These network nodes may relate to media sources 204 and/or media caches 216 that are configured to transmit requested media data to a client device. A client device may use a manifest file to select one or more tile streams on the basis of a viewpoint that is provided by the video processing device to the client device.

A client device $220_{1-3}$ in a media device $218_{1-3}$ may receive and buffer the media data of the tiles and prepare the media data as one or more bitstreams for input to a media engine $222_{1-3}$. The media engine may comprise one or more decoders for decoding the media data of the tiles into video frames. Then, the generated video frames are forwarded to a rendering engine $224_{1-3}$ that is coupled to the media engine. The rendering engine may comprise frame buffers for buffering the video frames and a fusion processor (not shown) for fusing video frames of the different tile streams into a single video frame 226 representing equirectangular version of a field of view (FOV) that needs to be transformed into a spherical representation for rendering.

FIG. 3A-3D illustrate various ROIs on a spherical surface for processing spherical video data according to various embodiments of the invention. In particular, FIG. 3A-3D illustrate various ROI defined on the basis of a 3D spherical coordinate system.

In an embodiment, the yaw-pitch-roll angular coordinate system (also known as spherical coordinate system) may be used to represent regions on a sphere. Here, the yaw ranges between 0 and 360 degrees, and pitch and roll range between −90 and +90. The starting (0 degrees) position of the yaw axis may be chosen arbitrarily by a content provider, or be consistent with the cardinal directions with 0 and 360 degrees representing North, 90 degrees representing East, 180 degrees representing South and 270 degrees representing West. For the pitch axis, the positive values may represent direction above the horizon and negative values represent directions below the horizon. For the roll axis the assumption may be made that positive values indicate that the left eye of the user is higher than the right eye, and conversely negative values indicate that the user's head is tilted in the opposite way (with the left eye being lower than the right eye).

In an embodiment, three angular parameters (a spherical ROI coordinate) may be used to indicate the position of the ROI on the sphere. In an embodiment, the three yaw-pitch-roll angles ($\theta$, $\varphi$, $\psi$) may be used to indicate the center and orientation of the ROI. In this embodiment, the boundaries of the ROI may be preconfigured in the client device or may be determined by the client device based on the centre and orientation of the ROI. Additionally, the boundaries of the ROI may be based on information on where the ROI needs to be projected.

In order to provide the ability to provide a smooth and seamless switch between different rendering modes of the video processing device, it may be advantageous to signal a complete ROI within the 3D spherical coordinate system to the client device.

In an embodiment, the ROI on a sphere may have the shape of a spherical polygon. For these polygons, it holds that each side is defined a line segment of a great-circle. For example, FIG. 3A depicts a spherical polygon that has the shape of a rectangular on a sphere. In an embodiment, a number of angular coordinates may be used to define a such rectangular spherical polygon. In an embodiment, five angular coordinates may be used to define a rectangular ROI on the sphere, including: $\theta$, $\varphi$, $\psi$, the three yaw-pitch-roll angles to indicate the center and orientation of the ROI and the parameters w, h: where w represents the ROI's width in degrees of arc and h represents the ROI's height in degrees of arc.

Here the height h may be defined as a segment on the great-circle passing through the ROI's centre and having bearing equal to $\psi$. Similarly, the width w may be defined as a segment that is located on the great-circle passing through the ROI's centre and substantially orthogonal to the great-circle associated with the height h.

In a further embodiment, the ROI may be defined as a circular ROI on a sphere as depicted in FIG. 3B. In that case four angular coordinates ($\theta$, $\varphi$, $\psi$, r) may be used to describe the circular ROI on the sphere, where the first 3 coordinates indicate the centre and orientation of the ROI and the radius r represents the radius length in degrees of arc.

Figure 3C:
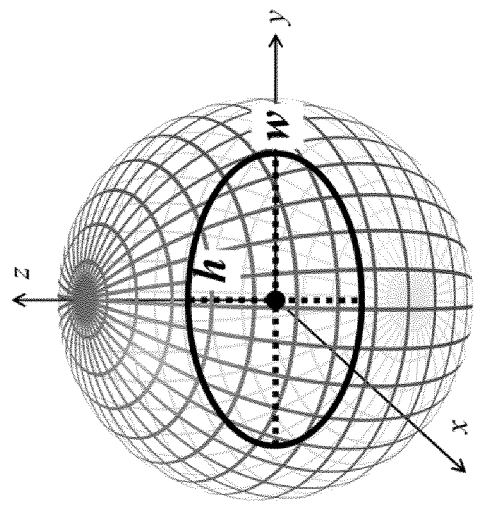
Figure 3C:
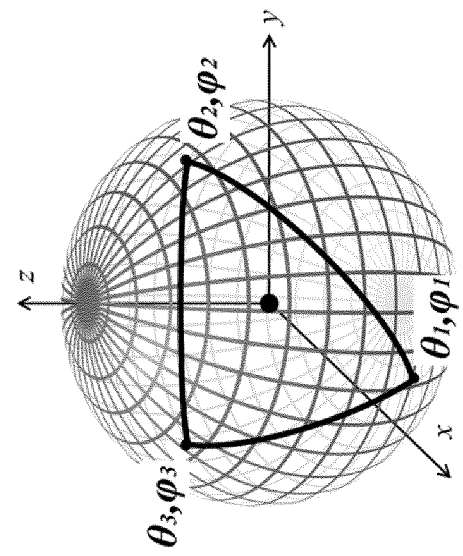
Figure 3C:
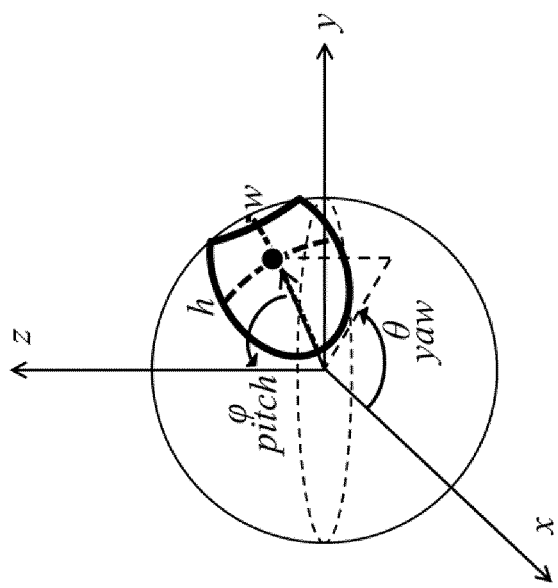

In an embodiment, the ROI may be defined as an elliptical ROI on a sphere as depicted in FIG. 3C. The elliptical form may be defined on the basis of 5 angular coordinates including: $\theta$, $\varphi$, $\psi$: the three yaw-pitch-roll angles to indicate the center and orientation of the ROI and the parameters w, h wherein w and h represent the length in degrees of arc of the elliptical ROI's axes on the sphere (in a similar way as the w and h parameters of the rectangular ROI).

Figure 3D:
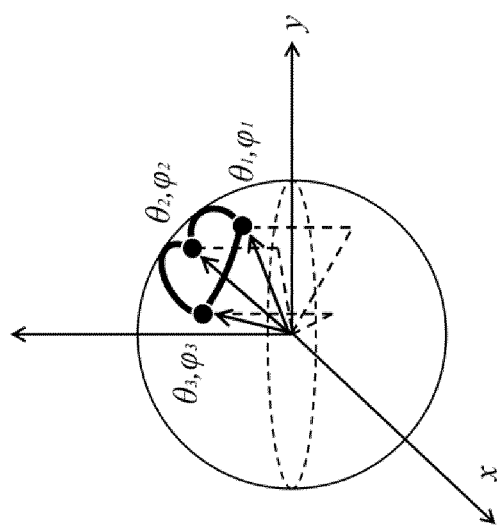

In yet another embodiment, the ROI may be defined as an generic polygonal ROI on a sphere as depicted in FIG. 3D.

The generic polygon may have n edges (with n>=3). Such ROI on a sphere may be characterized by a list of 1+2n angular coordinates, of which one coordinate (e.g. the first coordinate) represents the orientation of the ROI and the other 2n couples of coordinates represent the yaw and pitch angles of the edges: ($\psi$, $\theta_1$, $\varphi_1$, $\theta_2$, $\varphi_2$, $\beta\theta_n$, $\varphi_n$, n>=3).

Figure 4:
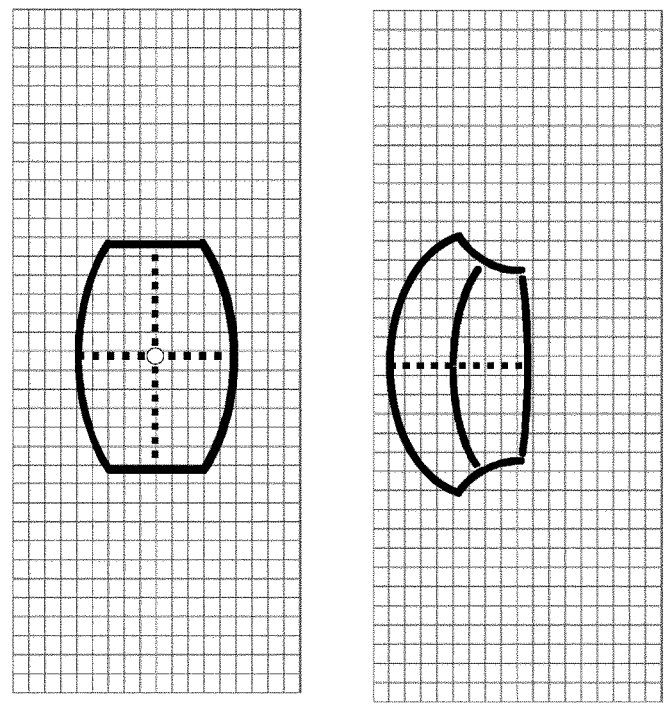
FIG. 4 illustrates illustrate a ROI on a spherical surface for processing spherical video data according to yet another embodiments of the invention.
Figure 4:
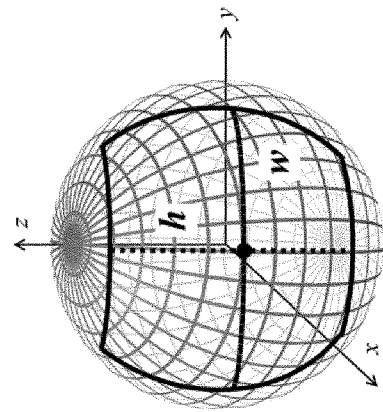

FIG. 4 illustrates illustrate a ROI on a spherical surface for processing spherical video data according to yet another embodiments of the invention. In particular, the ROI on a sphere as depicted in FIG. 4 has a rectangular shape wherein the sides parallel to its width are line segments of small-circles of the sphere and the sides parallel to its height are line segments of big-circles of the sphere. Hence, in this embodiment, the shape of the ROI on the sphere may have sides that are not arcs (line segments) on a great-circle, but on other type of circles on a sphere: such as small-circles or Rhumb lines or a combination of thereof.

The ROIs illustrated in FIGS. 3 and 4 are defined such that the shape of the ROI does not change as a function of the position of the ROI on the sphere. This way a consistently shaped ROI may be defined on the sphere. This is in contrast to the shape of subregions (tiles) of spherical video data as signaled to the client device in so-called spatial relationship descriptor (SRD) for VR applications as described in MPEG contribution ISO/IEC JTCC1/SC29/WG11 MPEG2016/m38605 wherein tiles on a sphere are defined as so-called longitude-latitude rectangles wherein, only lines of longitude (defining the height of the rectangle) are great circle arcs and lines of latitude (defining the width of the square) are not (these are lines of a small circle). Hence, defining a ROI on the basis of the SRD for VR will result in a ROI that has a shape and area that is not constant as a function of the position of the ROI on the sphere. Such regions on a sphere are not or at least less suitable for selecting spherical video data for rendering.

In order to allow spherical video to be coded on the basis of conventional coding schemes, spherical video is first processed into a format that can be input to conventional an encoder. As conventional codecs can only handle planar rectangular video frames, the video data are typically mapped onto the shape of a conventional rectangular video frame format. Different mappings can be used.

Figure 5:
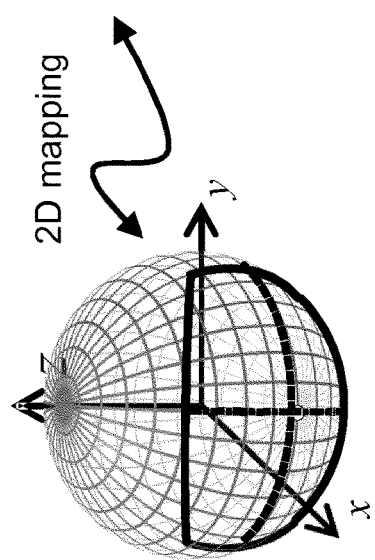
FIG. 5 illustrates a ROI on a spherical surface and its associated 2D mapping on a surface according to an embodiment of the invention.
Figure 6:
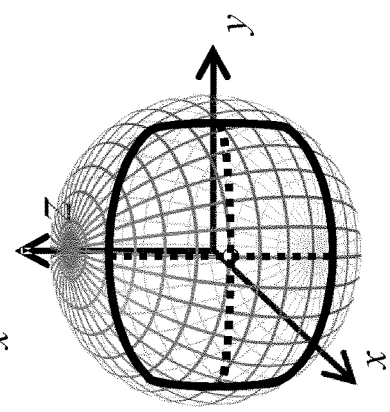
FIG. 6 illustrates a ROI on a spherical surface and its associated 2D mapping on a surface according to an embodiment of the invention.

For example FIGS. 5 and 6 illustrate an example of a ROI on a spherical surface for selecting spherical video and its associated 2D mapping on a surface. These figures depict a so-called equirectangular projection of the spherical content onto a rectangular plane. Such mapping results into a video picture comprising a front-, left-, right- and back-side of the sphere, wherein towards the north and south pole objects (pixels) get distorted in the picture due to the projection. On the decoder size, the equirectangular projection needs to be transformed back into content that is projected onto a curved, e.g. spherical, surface.

Depending on the way the spherical video generated and depending on the type of VR application other different types of projections (2D mappings) may be used. The type of mapping and the parameters needed for the mapping is referred to as mapping information. For spherical content only the part of the video data that correspond to the ROI need to be played out. The ROI represents an area on a spherical surface, hence in order to use the ROI for selecting spherical video data on the basis of the 2D mapped video data, the ROI first needs to be mapped to the 2D plane. In the example of FIG. 5 the ROI is positioned along the equator of the sphere. The corresponding 2D mapped ROI is located at a position that corresponds with a position along the equator. FIG. 6 depicts the same ROI which is now moved in a direction towards the north pole of the sphere. In that case, the corresponding 2D mapped ROI will also move to a position close to the north pole. Due to the 2D mapping, the shape of the 2D mapped ROI changes as a function of the position of the ROI on the sphere. This effect needs to be taken into effect when selecting spherical video on the basis of a ROI.

Moreover, when using other—more complex—2D mappings, the shape of the 2D mapped ROI will change in a different way. Hence, when selecting spherical content on the basis of a spherical description of a ROI (i.e. a ROI on a sphere), the client device will use different video data selection algorithms for different 2D mappings. The client device thus needs to know the 2D mapping that is used for representing the spherical video data in the bitstream in order to select an appropriate content selection algorithm. As will be described hereunder in more detail, the 2D mapping that is used for representing the spherical video data in the bitstream is signaled to the client device on the basis of metadata in the manifest file.

Figure 7:
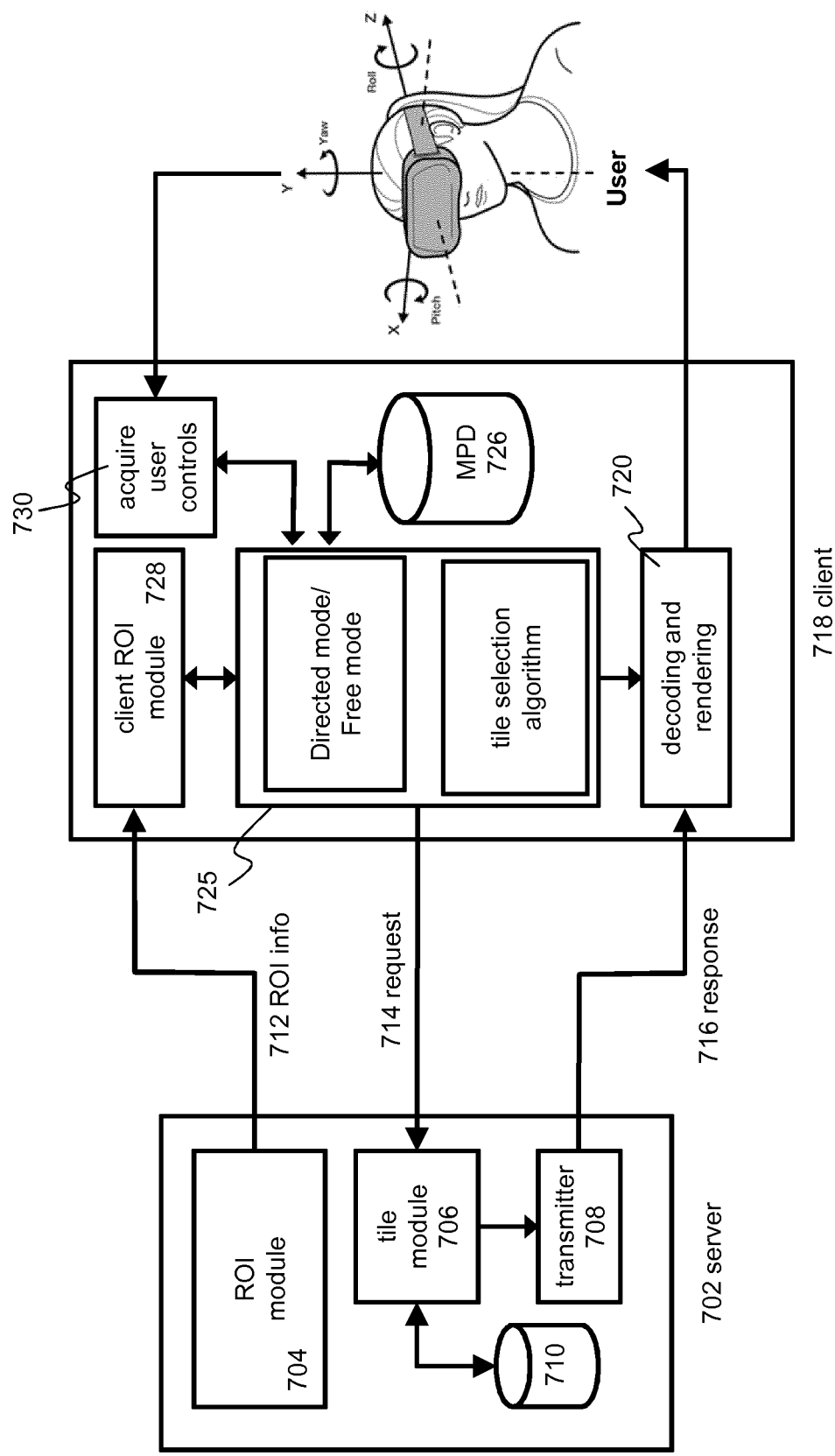
FIG. 7 depicts a system for rendering spherical video data on the basis of a ROI according to an embodiment of the invention.

FIG. 7 depicts a system for rendering spherical video data on the basis of a ROI according to an embodiment of the invention. As shown in FIG. 7, the system may include a server 702 and a client 718. The server may be configured to receive requests 714 from the client for transmitting spherical video data stored on a storage medium 710 to the client. To that end, the server may include a transmitter 708 configured to transmit spherical video data in response messages 716 to the client. As already described earlier, the spherical video data may be stored as a set of tile streams, wherein each tile represents spherical video data of a tile at a predetermined position on the spherical surface.

The server may further comprise a server ROI module 704 that is configured to determine a time-specific ROI defining an area of a particular shape on a spherical surface (a ROI area) on the basis of a spherical coordinate system. The ROI may be defined in such a way that shape and the area of the ROI does not change (is constant) as a function of the position of the ROI on the sphere. The server ROI module may be further configured to communicate ROI information, including the spherical ROI coordinate to a client device which may be part of a video processing device that is capable of rendering spherical video data.

Further, metadata associated with the spherical content may be send to the client device. In an embodiment, metadata may be sent in a manifest file to the client device, which may store the manifest file, e.g. an MPD, in a memory 626. The manifest file may include one or more tile stream identifiers for identifying one or more tile streams. Each tile stream comprising spherical video data of a subpart (a tile) of the surface of a sphere. This way each subpart may define a spherical tile at a predetermined position on the sphere. The manifest file may further comprise spatial description information for signaling the client apparatus information on the (static) position of the tiles on the sphere and projection information for signaling the client apparatus about the type of 2D projection (e.g. equirectangular, cubic, etc.) that is used for representing the spherical video data in a bitstream.

The client device may further comprise a processor 725 that is configured to receive the ROI information and user input from a user control module 730 associated with the client device. The user control module may receive signals from the user informing the client device whether the user would like to receive the spherical video data in free mode or directed mode. Based on this information, the processor may set the client in a desired streaming mode, which may require switching from free mode to directed mode or vice versa.

The identification of the spherical content may include identifying one or more tile streams in the manifest file wherein the spherical video data of the identified tile streams encompasses the spherical video data identified by the ROI. To that end, the processor may use a tile selection algorithm which may depend on the type of projection that is used to represent the spherical video data in the bitstream. The client device may then use the metadata in the manifest file in order to request the server to transmit the identified spherical video data, e.g. one or more tile streams, to the client device.

If the streaming mode is set to "free mode", the client receive user control information (e.g. sensor information associated with head movements, body movements, etc.) and determine a ROI on a position of a sphere on the basis of this information. Then based on the mapping information, the client device may select a selection algorithm for selecting spherical video data on the basis of the ROI.

The client device may then use an appropriate selectin algorithm for selecting the spherical video data associated with the ROI. The selection may include determining the 2D mapped ROI area and use it together with the 2D mapped spherical video data in order to select the spherical video data of the ROI.

If the streaming mode is set to "directed mode", the client requests the server for the details of the predetermined ROI. Once the coordinates of the predetermined ROI are received, the client may proceed to identify the location of the ROI in the video provided in the bitstream.

In an embodiment, the ROI information may be formatted according to an ISOBMFF file format. In particular, the spherical ROI coordinates may be stored on the basis of a ISOBMFF file format. In an embodiment, a sample entry may be defined comprising an implicit upper and lower bound:

```
aligned(8) class 3DSphericalCoordinatesSampleEntry
        extends MetadataSampleEntry ('3dsc') {
}
```

In this example, the arbitrary choice is that the pitch angle is bound between −90 and 90 degrees while the yaw angle is bound between 0 and 360 degrees. In an embodiment, the sample entry may provide the lower and upper bound against which the angles have been computed:

```
aligned(8) class 3DSphericalCoordinatesSampleEntry
        extends MetadataSampleEntry ('3dsc') {
        unsigned int(16)    reference_width;
        unsigned int(16)    reference_height;
        unsigned int(4) shape_type;
}
```

In this embodiment, the reference width and reference height parameters give respectively the width and height, in terms of yaw and pitch angles, of the spherical surface in which ROI coordinates may be defined.

The parameter shape_type defines the shape of the area on the surface sphere. As an example, we can consider the following shape type for the ROI:

| Values | Shape |
|---|---|
| 0 | 4 borders defined by great circles |
| 1 | Top and bottom borders defined by small circles. Left and right borders defined by great circles. |
| 2 ... 15 | reserved |

In an embodiment, for efficient storage, the yaw and pitch angles may be stored using a binary angles approach (also referred to as binary angular measurement or BAM). That is, the entire range of the binary variable is used to code values. This way, accurate representations of the angular values is possible which always stay in the range of 0 and 360 by wrapping behavior of binary integer. A 16-bit field for the yaw angle may be selected allowing allows an increment of 360/2^16=0,0054931640625 degrees. For the pitch angle, a 16-bit field yields a precision of 180/2^16=0, 0027466239414053559166857404404 degrees. Alternatively, smaller fields may be used to code the angles more efficiently to the cost of a loss of precision.

The a data field for a rectangular ROI in a 3D spherical coordinates system may follow the syntax:

```
aligned(8) class 3DShpericalCoordinatesSample( ){
        unsigned    int(16) yaw_center;
        unsigned int(16)    pitch_center;
        unsigned int(16)    roll_center;
        unsigned int(16)    width;
        unsigned    int(16) height;
        unsigned int(1) interpolate;
        unsigned int(7) reserved;
}
```

Here, the yaw_center and pitch_center parameters signal respectively the horizontal and vertical coordinate of the centre of the ROI on the spherical surface. The roll_center parameter signals the orientation of the ROI on the spherical surface associated with the media sample of the reference track. The width and height parameters signal respectively the width and height of the region on the spherical surface associated with the media sample of the referenced track.

Further, the interpolate parameter indicates the continuity in time of the successive samples. When true, a client application may linearly interpolate values of the ROI coordinates between the previous sample and the current sample. When false, no interpolation is used.

In an embodiment, a client device may process the ROI information on the basis of an adaptive streaming protocol, preferably the MPEG-DASH streaming protocol. For example, when the client device has received ROI information for displaying certain spherical content to the user, the client device needs to be able to retrieve the position of the ROI in the spherical content is stored in the network.

Typically, when using MPEG-DASH the client device may use an manifest file (an MPD) for retrieving content, including a spherical representation of the content. The manifest file may define one or more tile stream identifiers for identifying tile streams, each tile stream comprises transformed spherical video data of a tile on the spherical surface wherein each tile defines a subpart on the spherical surface. The transformed spherical video data may result from transforming the spherical video data, which may at least in include a projection of the spherical video data onto a 2D flat plane. The manifest file may further comprising spatial description information for signaling the client apparatus information on the position of the tiles on the spherical surface.

Here it may be assumed that all content related to VR-based services may be described as Adaptation Sets in the MPD. These Adaptation Set may include an SRD descriptor that follows the syntax of the extended SRD for VR proposal of In MPEG contribution ISO/IEC JTCC1/SC29/WG11 MPEG2016/m38605, which discloses the following modifications to the SRD.

This SRD for VR-services includes a parameter space within the SupplementalProperty element or EssentialProperty element whose value indicates the type of the spherical video representation. This parameter may also imply the presence of new parameters to characterize the details of the spherical video representation (for example, a cylindrical space may be represented as space=cylindrical representation, and, optionally, one or more additional parameters that characterizes the cylinder, e.g. height=150).

Alternatively, in an embodiment, instead of an SRD comprising the space parameter, a separate projection descriptor may be used in the manifest file for signaling the client device the type of projection that is used.

The semantics of the parameters object_x and object_y in the SRD for VR are changed with respect to the conventional SRD in the sense that the coordinates (object_x, object_y) represent the central position of the spatial subpart (a tile).

Furthermore, the parameters object_x and object_y may identify yaw and pitch angles, respectively. Yaw range is defined from 0 to 360 where 0=North, 90=East, 180=South and 270=West, Pitch range is from −90° (Nadir) to +90° (Zenith). This semantics better reflects the way in which VR rendering systems represent the user viewpoints. This way, a stream selection method based on the information in the SRD will allow faster selection of tile streams, which is essential to provide a good quality of experience.

The parameters object_width and object_height may represent the width and height of the object in terms of angular length of the object on a spherical surface. Specifically, the width of the object is represented by the degree of arc of its width measured on the parallel passing through the center of the object and the height is represented by the degree of arch of its height measured on the meridian passing through the center of the object.

The object_x and object_y parameters and the object_width and object_height parameters associated video data of each tile stream to a region on a spherical surface, which is consistent with the way in which a ROI on a sphere is defined according to the present invention.

Different resolution layers of the same spherical video data may be identified in the manifest file. In that case, all tile streams belonging to the same resolution layer may be identified on the basis of a parameter spatial_set_id. This parameter thus identifies all subparts belonging to the same resolution layer, and may be used to order the resolution layers from the lowest resolution to the highest resolution, the lowest starting from value 0. This way a client may easily identify all tile streams belonging to the same resolution layer.

A high-level description of the processing of the ROI information on the basis of an adaptive streaming protocol, such as the MPEG-DASH streaming protocol, will be described hereunder with reference to FIG. 8A-8C which illustrate the structure of a media presentation description MPD according to an embodiment of the invention.

Figure 8A:
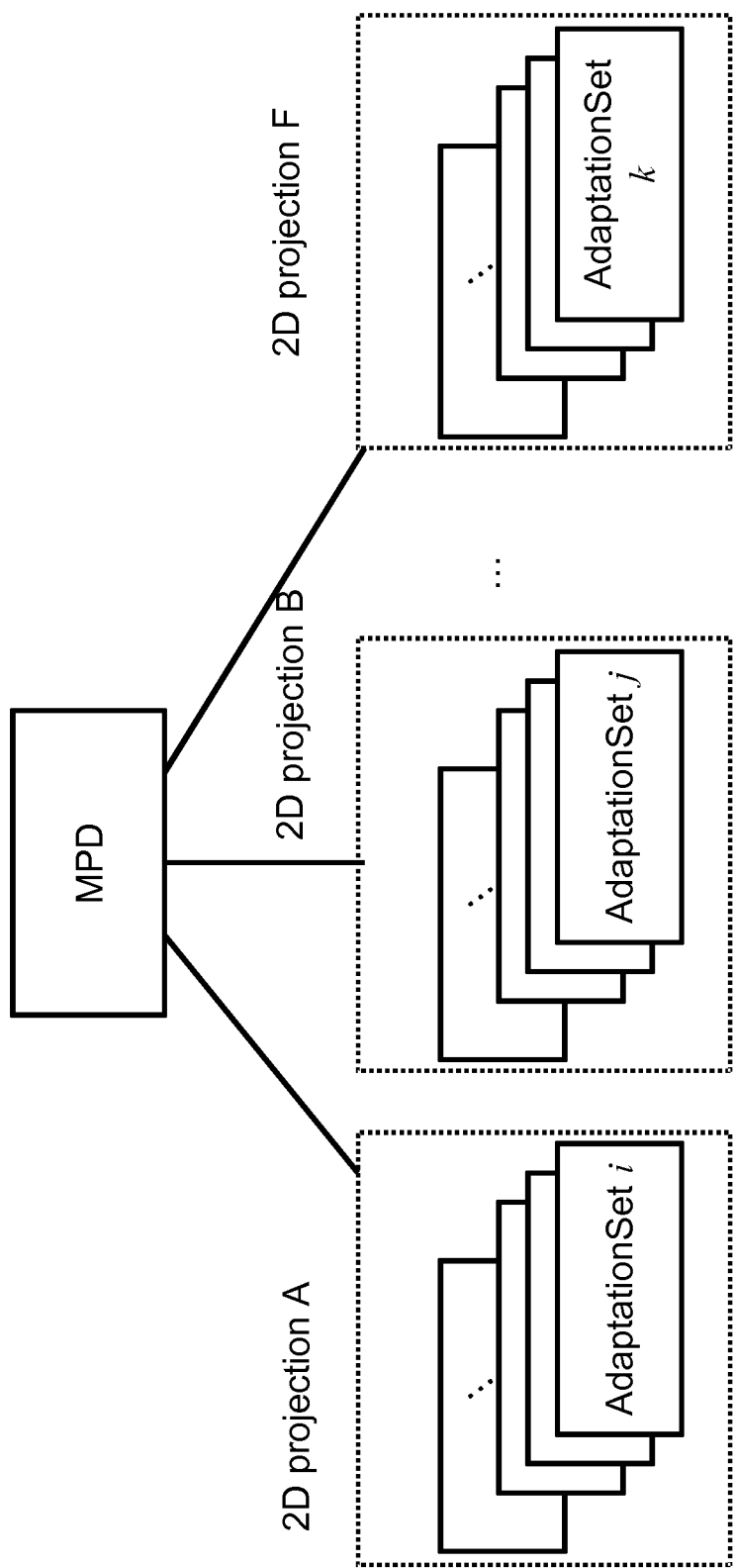

In a first step, the client device may select one of the 2D projections in which the spherical content is offered as shown in FIG. 8A. In this case, the client device may for example select 2D projection A on the basis of the information in the SRD (using the space parameter) or on the basis of a separate projection descriptor in the MPD.

Thereafter, in the second step, the client device may select one or more Adaptation Sets defining spherical content that combined may represent a surface on the spherical surface which includes the ROI. For example, if the spherical content is tiled the ROI overlap with more than one tile, so that a group of tiles is needed to form the spherical content associated with the ROI (e.g. Adaptation Sets 1, 4 and 10 in FIG. 8B).

To that end, the client device may compare the spherical position and size of the ROI with the spherical position and size of each of the spatial subparts, in order to assess which spatial subparts cover the ROI.

Figure 8C:
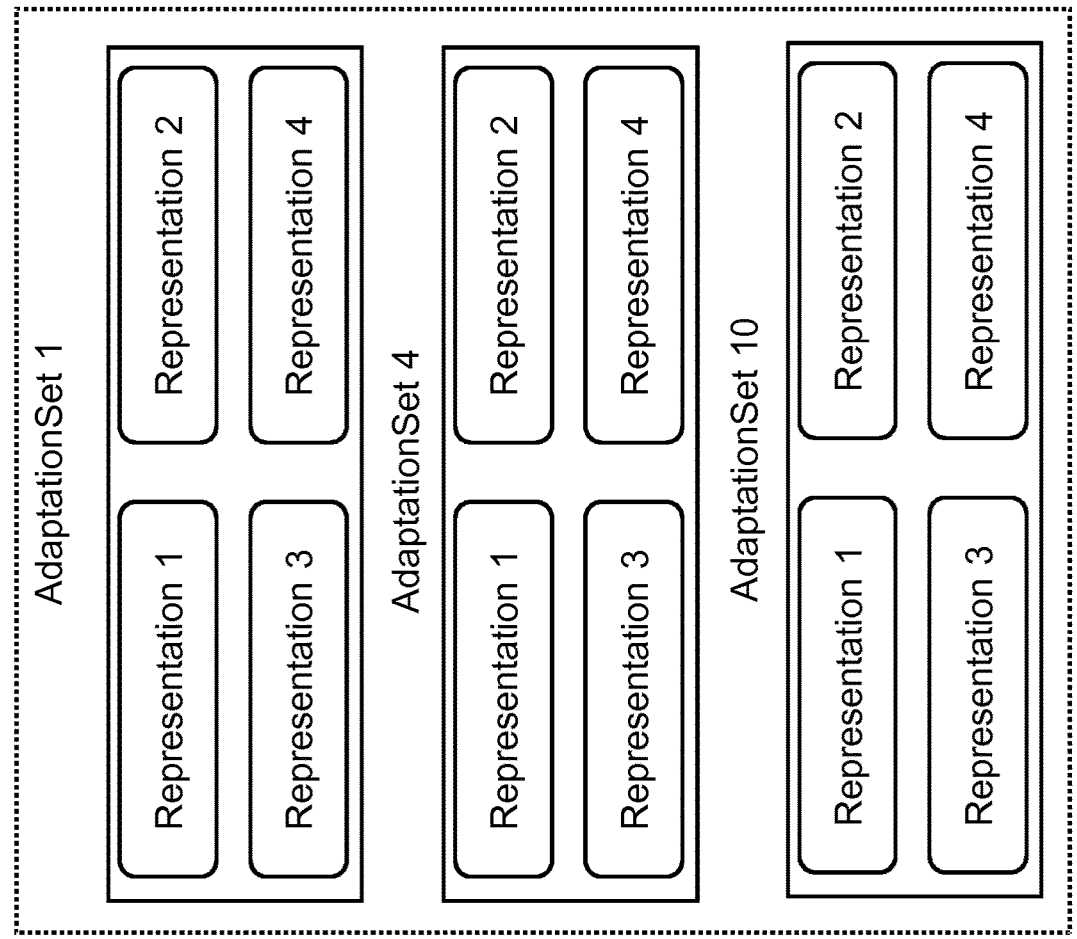

Then, in a third step, if more than one group of (alternative) representations is found (e.g. in different resolution representations as shown in FIG. 8C), the client device may select the group that according to its adaptation logic is more appropriate. For example, it might choose the group yielding to the highest visual quality or, the group that is closest, with respect to the quality, to the previously shown group. Choice might be also driven by codecs or user preferences. In any case, the representations selected should have the same properties (e.g. same codec, resolution, 2D projection etc.). For example, by selecting all adaptation sets characterized by the same spatial_set_id SRD parameter.

The first step described above may also be performed as a sub-step of the third step, in case the client supports multiple 2D projections and wants to defer the choice of which 2D projection to download, based on its adaptation logic (for example, a cylindrical 2D projection might allow to save more bandwidth than an equirectangular 2D projection, with the same visual quality).

Hereunder the step of selecting one or more Adaptation Sets defining spherical content that combined may represent a surface on the spherical surface which includes the ROI is described in more detail.

Figure 9:
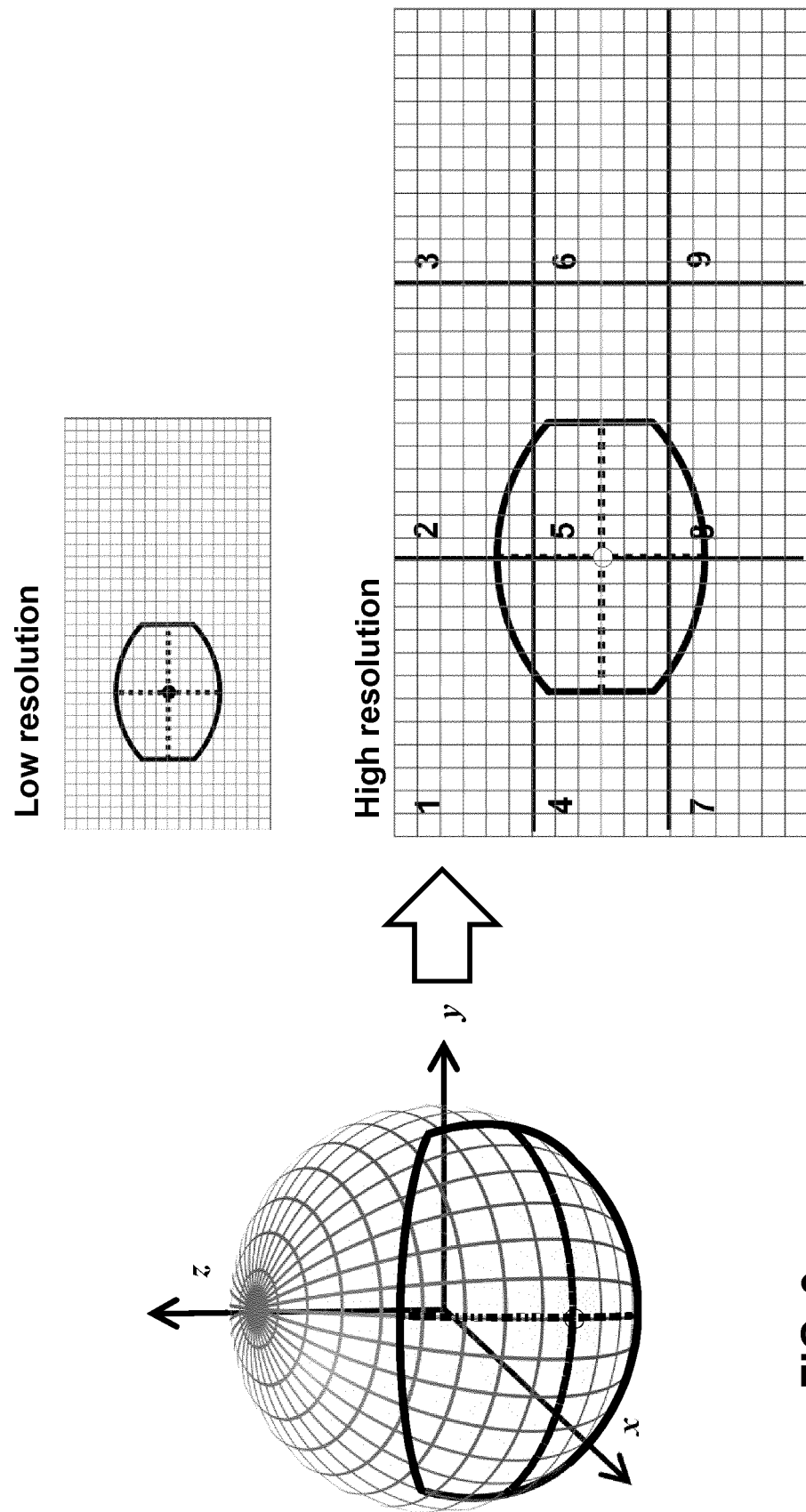
FIG. 9 illustrates a ROI on a surface and its associated 2D mapping on a surface according to an embodiment of the invention.

FIG. 9 illustrates a ROI on a surface and its associated 2D mapping on a surface according to an embodiment of the invention. In particular, the figure depicts a rectangular ROI similar to the one described with reference to FIG. 4. The ROI may be associated with spherical video in equirectangular format which may be available in different resolution layers, in this example two resolution layers, of which the highest resolution layer is also spatially tiled in 9 tiles. Different presentation of the same content may be generated. Both the low resolution version of the spherical video data and the tiled high resolution of the spherical video data are produced using the equirectangular projection. In addition, a "moving view" video stream for streaming a "director's cut" of the spherical video data is also made available to the client device.

In one embodiment, both content representations (spherical and moving view) may be processed and streamed to the client device on the basis of the MPEG DASH standard. In that case, the video content may be temporally segmented and the temporal segments may be stored as temporally segmented streams and made available on a HTTP server. Additionally, video content of the high resolution layer may also be spatially segmented and stored as (temporally segmented) tile streams. The URLs of the streams may be provided in the manifest file which is referred to in DASH as the Media Presentation Description (MPD).

An example of an MPD according to an embodiment of the invention is provided in table 1 hereunder. The MPD in this example may define multiple, in this example, 12 adaptation sets: one adaptation set defining a low-res representation of the full sphere, nine adaptation sets defining nine tile streams which form the high-resolution representation, one adaptation set defining a moving view video stream and one adaptation set defining the ROI coordinates associated with the moving view video stream. Here, the adaptation set containing the low-res representation has spatial_set_id set to 0 and the nine adaptation sets containing the representations corresponding to the high-res tiles all have a spatial_set_id set to 1.

In an embodiment, the coordinates of the ROI associated with the moving view video stream may be provided in the representation whose @id attribute is "view_coord". The @codecs attribute of this representation indicates "3dsc" referring to a 3D spherical coordinate sample entry as defined earlier in this disclosure.

In an embodiment, the coordinate representation may be tagged with the @association Type attribute of value "cdsc" and is associated with the Representation of @id "director_cut" via the @associationId attribute. The Representation "director_cut" contains a dynamic SRD. That is, since the coordinates are dynamic, they are provided in the segments of the Coordinate Representation and the SRD contains the @id of this particular Representation for the client to download them.

Additionally, in an embodiment, a dedicated projection descriptor may be used for signaling the projection type to the client device. For example, in the MPD in table 1 hereunder the projection descriptor "urn:mpeg:omaf:projection:2016" is used to signal that the spherical video data in the stream are transformed spherical video data, wherein transformation includes at least a projection of the spherical video data onto a 2D flat plane using an equirectangular projection type.

TABLE 1

MPD according to an embodiment of the invention.

```xml
<?xml version="1.0" encoding="UTF-8"?>
<MPD
 xmlns="urn:mpeg:dash:schema:mpd:2011"
 type="static"
 mediaPresentationDuration="PT10S"
 minBufferTime="PT1S"
 profiles="urn:mpeg:dash:profile:isoff-on-demand:2011">
 <ProgramInformation>
  <Title>Example of a DASH Media Presentation Description using Spatial Relationships
Description to signal tiled VR content</Title>
 </ProgramInformation>
 <Period>
  <!-- low-res layer -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
       <SupplementalProperty schemeIdUri="urn:mpeg:omaf:projection:2016"
value="equirectangular"/>
    <SupplementalProperty schemeIdUri="urn:mpeg:dash:srd:vr:2016"
value=0,180,0,360,180,360,180,0"/>
    <Representation mimeType="video/mp4" codecs="avc1.42c01e" width="450" height="800"
bandwidth="269011" startWithSAP="1">
      <BaseURL> full_video_lowres.mp4</BaseURL>
      <SegmentBase indexRangeExact="true" indexRange="837-988"/>
      </Representation>
  </AdaptationSet>
  <!-- High-res layer -->
  <!-- Tile 1 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
       <SupplementalProperty schemeIdUri="urn:mpeg:omaf:projection:2016"
value="equirectangular"/>
    <EssentialProperty schemeIdUri="urn:mpeg:dash:srd:vr:2016" value="0,
60,60,120,60,360,180,1"/>
    <Representation mimeType="video/mp4" codecs="avc1.42c00d" width="300" height="533"
bandwidth="134689" startWithSAP="1">
      <BaseURL> tile1_video_highres.mp4</BaseURL>
      <SegmentBase indexRangeExact="true" indexRange="837-9887>
      </Representation>
  </AdaptationSet>
  <!-- Tile 2 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
       <SupplementalProperty schemeIdUri="urn:mpeg:omaf:projection:2016"
value="equirectangular"/>
    <EssentialProperty schemeIdUri="urn:mpeg:dash:srd:vr:2016" value="0,
180,60,120,60,360,180,1"/>
    <Representation mimeType="video/mp4" codecs="avc1.42c00d" width="300" height="533"
bandwidth="134689" startWithSAP="1">
      <BaseURL> tile2_video_highres.mp4</BaseURL>
      <SegmentBase indexRangeExact="true" indexRange="837-988"/>
      </Representation>
  </AdaptationSet>
  ...
  <!-- Tile 4 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
       <SupplementalProperty schemeIdUri="urn:mpeg:omaf:projection:2016"
value="equirectangular"/>
    <EssentialProperty schemeIdUri="urn:mpeg:dash:srd:vr:2016" value="0,
60,0,120,60,360,180,1"/>
    <Representation mimeType="video/mp4" codecs="avc1.42c00d" width="300" height="533"
bandwidth="134689" startWithSAP="1">
      <BaseURL> tile4_video_highres.mp4</BaseURL>
      <SegmentBase indexRangeExact="true" indexRange="837-988"/>
      </Representation>
  </AdaptationSet>
  <!-- Tile 5 -->
  <AdaptationSet segmentAlignment="true" subsegmentAlignment="true"
subsegmentStartsWithSAP="1">
    <Role schemeIdUri="urn:mpeg:dash:role:2011" value="supplementary"/>
       <SupplementalProperty schemeIdUri="urn:mpeg:omaf:projection:2016"
value="equirectangular"/>
    <EssentialProperty schemeIdUri="urn:mpeg:dash:srd:vr:2016" value="0,
180,0,120,60,360,180,1"/>
```

TABLE 1-continued

MPD according to an embodiment of the invention.

```
    <Representation mimeType="video/mp4" codecs="avc1.42c00d" width="300" height="533" bandwidth="134689" startWithSAP="1">
      <BaseURL> tile5_video_highres.mp4</BaseURL>
      <SegmentBase indexRangeExact="true" indexRange="837-988"/>
    </Representation>
  </AdaptationSet>
...
  <!-- Tile 7 -->
  <AdaptationSet segmentAlignment="true" subsegmentAlignment="true" subsegmentStartsWithSAP="1">
    <Role schemeIdUri="urn:mpeg:dash:role:2011" value="supplementary"/>
        <SupplementalProperty schemeIdUri="urn:mpeg:omaf:projection:2016" value="equirectangular"/>
    <EssentialProperty schemeIdUri="urn:mpeg:dash:srd:vr:2016" value="0, 60,-60,120,60,360,180,1"/>
    <Representation mimeType="video/mp4" codecs="avc1.42c00d" width="300" height="533" bandwidth="134689" startWithSAP="1">
      <BaseURL> tile7_video_highres.mp4</BaseURL>
      <SegmentBase indexRangeExact="true" indexRange="837-988"/>
    </Representation>
  </AdaptationSet>
  <!-- Tile 8 -->
  <AdaptationSet segmentAlignment="true" subsegmentAlignment="true" subsegmentStartsWithSAP="1">
    <Role schemeIdUri="urn:mpeg:dash:role:2011" value="supplementary"/>
        <SupplementalProperty schemeIdUri="urn:mpeg:omaf:projection:2016" value="equirectangular"/>
    <EssentialProperty schemeIdUri="urn:mpeg:dash:srd:vr:2016" value="0, 180,-60,120,60,360,180,1"/>
    <Representation mimeType="video/mp4" codecs="avc1.42c00d" width="300" height="533" bandwidth="134689" startWithSAP="1">
      <BaseURL> tile8_video_highres.mp4</BaseURL>
      <SegmentBase indexRangeExact="true" indexRange="837-988"/>
    </Representation>
  </AdaptationSet>
...
  <!-- Moving view -->
  <AdaptationSet segmentAlignment="true" subsegmentAlignment="true" subsegmentStartsWithSAP="1">
    <Role schemeIdUri="urn:mpeg:dash:role:2011" value="main"/>
    <EssentialProperty schemeIdUri="urn:mpeg:dash:srd:dynamic:2016" value="0,view_coord, 1"/>
        <SupplementalProperty schemeIdUri="urn:mpeg:omaf:projection:2016" value="equirectangular"/>
    <Representation id="director_cut" mimeType="video/mp4" codecs="avc1.42c00d" width="300" height="533" bandwidth="134689" startWithSAP="1">
      <BaseURL>director_cut_video.mp4</BaseURL>
      <SegmentBase indexRangeExact="true" indexRange="837-988"/>
    </Representation>
  </AdaptationSet>
  <!-- Coordinate of the moving window in the sphere -->
  <AdaptationSet segmentAlignment="true" subsegmentAlignment="true" subsegmentStartsWithSAP="1">
    <Representation id="view_coord" associationId="director_cut" associationType="cdsc" codecs="3dsc" bandwidth="100" startWithSAP="1">
      <BaseURL>director_cut_coord.mp4</BaseURL>
      <SegmentBase indexRangeExact="true" indexRange="707-858"/>
    </Representation>
  </AdaptationSet>
 </Period>
</MPD>
```

For each adaptation set of the same resolution layer, the client device may perform the following steps:

1) identify the edges of the bounding box of the ROI;
2) identify the tiles located within the horizontal and vertical boundaries of the ROI.

Figure 10A:
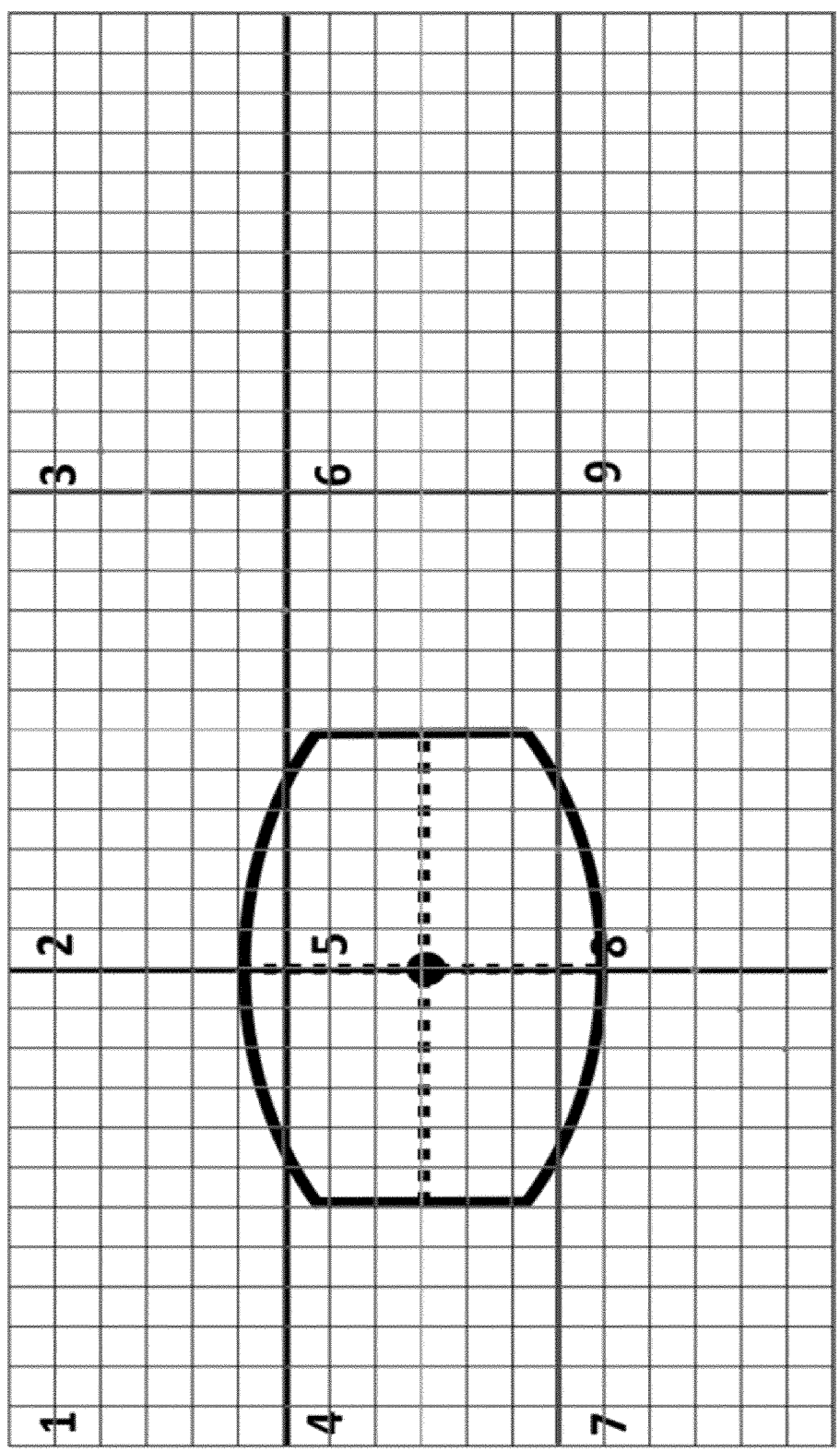
FIG. 10A-10B illustrates the construction of a bounding box around a 2D mapping of a ROI on a spherical surface.

FIG. 10A depicts the position of the ROI on the 2D equirectangular projection. To that end, the spherical ROI is projected on the 2D plan using the equirectangular projection.

Figure 10B:
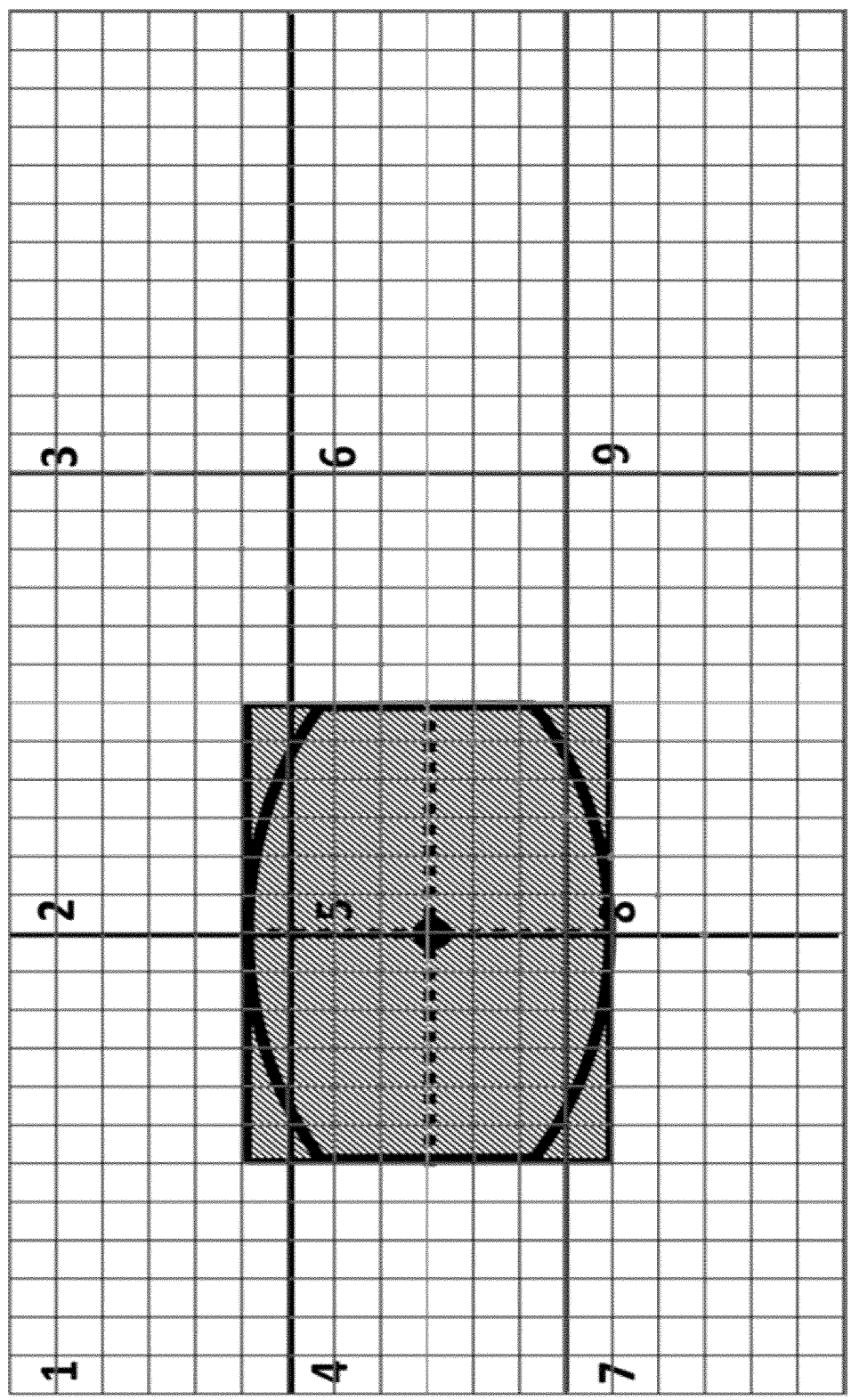

Thereafter, the client device may determine the "bounding box", in the 2D projection, that contains the ROI as defined in the spherical coordinate system. The bounding box may be defined as the smallest rectangle, whose sides are conform with the 2D mapping representation, that can contain the ROI defined in the 3D spherical space. For example, in the equirectangular 2D mapping in FIG. 10B, the bounding box is a rectangle whose sides are parallel to the sides of the 2D projected representation.

Thereafter, the client device may identify the horizontal and vertical boundaries of the ROI.

As described above, a rectangular ROI may be characterized by the following angular parameters: ($\theta$, $\varphi$, $\psi$, w, h). In the case of the ROI of FIG. 10A, these parameters may be (120,0,0, 120, 90) meaning that the ROI is centered in (120, 0), it has a roll degree of 0, and a size of (120, 90).

In order to determine the bounding box of the ROI, first the coordinates of the four vertices of the ROI and of the centres of the ROI's edges are calculated.

Figure 11A:
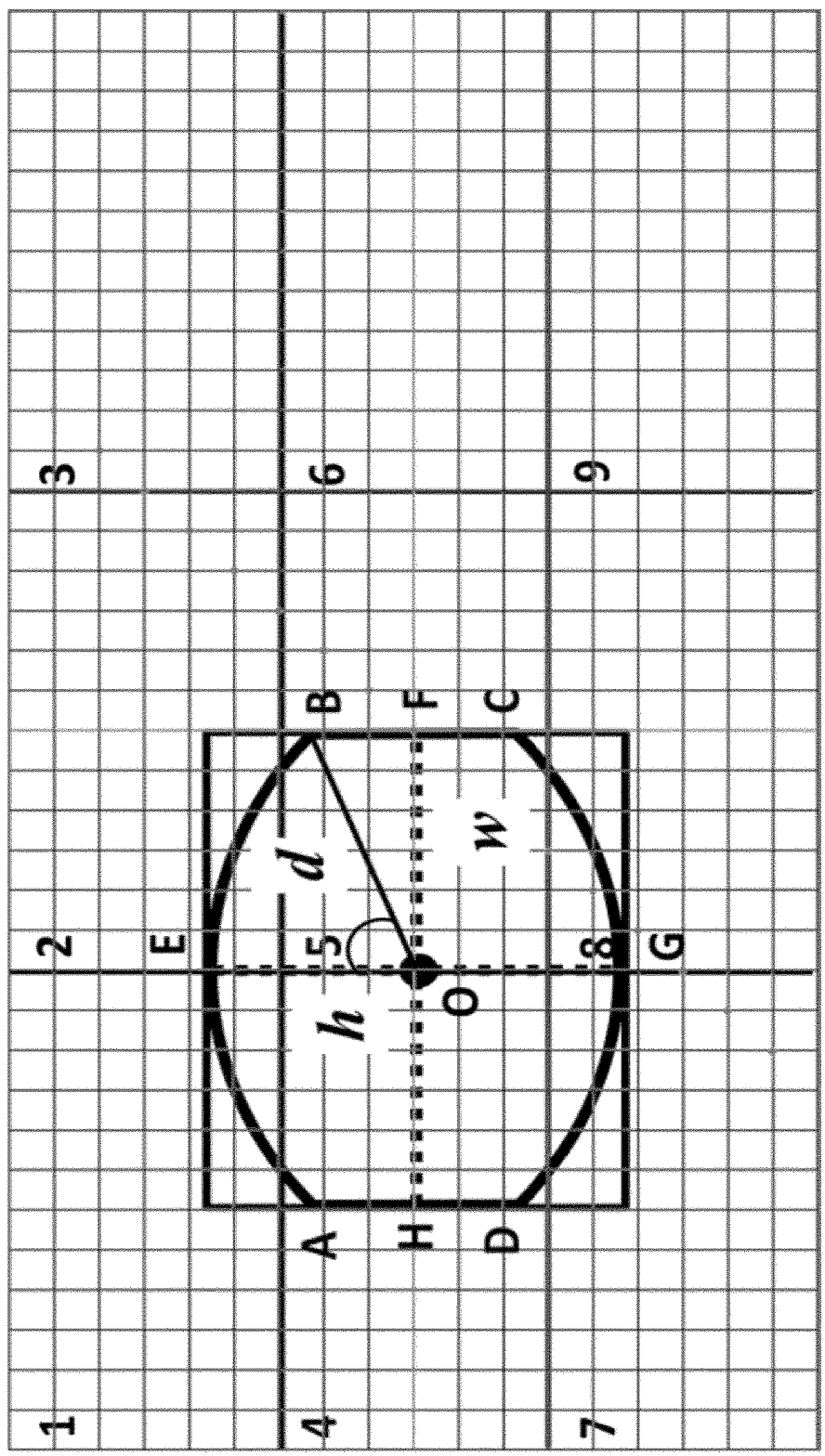
FIG. 11A-11B illustrates the determination of the edges of the bounding box around a 2D mapping of a ROI on a spherical surface.

To this end, spherical trigonometry rules may be used including the following steps:
1. calculating the coordinates of one of the ROI's vertices, e.g. vertex B, as intersection of the two great-circles on which the ROI's sides around the vertex are located (i.e. the great-circle passing through the segment AB and the great-circle passing through the segment BC).
2. Once a vertex's coordinates are known, calculating d, the distance over the sphere between the ROI's centre and the vertex, and calculating the bearing of d, which is the angle that the d segment forms with the yaw axis as shown in FIG. 11A (illustrating the ROI with vertices, middle points of the segments representing the ROI's sides, d, w and h highlighted).
3. Use d and bearing for calculating the coordinates of the remaining vertices.

According to step 1 the two intersecting great-circles need to be calculated. A great-circle is defined by two points on it. As first point for the great-circle passing through the segment AB, E is selected and as first point for the great-circle passing through the segment BC, F is selected.

Thereafter, the coordinates of the points E and F (middle points of the sides AB and BC of the ROI, respectively) are calculated using the reverse of the Haversine formula based on the knowledge of the coordinates of the ROI's centre, the distance of E and F from the ROI's centre (h/2 and w/2 respectively) and the bearing of these distance segments (0 and π/2 respectively), corrected by the ROI's orientation, given by ψ:

$$\varphi_E = a\sin(\sin(\varphi) * \cos((h/2)/R) + \cos(\varphi) * \sin((h/2)/R) * \cos(-\psi))$$

$$\theta_E = \theta + a\tan2(\sin(-\psi) * \sin((h/2)/R) * \cos(\varphi), \cos((h/2)/R) - \sin(\varphi) * \sin(\varphi_E))$$

$$\varphi_F = a\sin(\sin(\varphi) * \cos((w/2)/R) + \cos(\varphi) * \sin((w/2)/R) * \cos(\frac{\pi}{2} - \psi))$$

$$\theta_F = \theta + a\tan2(\sin(\frac{\pi}{2} - \psi) * \sin((w/2)/R) * \cos(\varphi), \cos((w/2)/R) - \sin(\varphi) * \sin(\varphi_F))$$

Here R is the radius of the sphere. For simplicity, in this embodiment a sphere with circumference 360 is selected, since the degrees of arc are used as the units of measurement of the distances on the sphere (e.g. d is calculated in degrees of arc). If the coordinates are out of scale, these are corrected in order to fit in the yaw and pitch scales.

Then, a second point on the great-circle passing through the segment AB, and a second point on the great-circle passing through the segment BC need to be calculated. As second point on the segment AB, E2 is selected, defined as intersection between the great-circle passing through AB and the great-circle passing through the w segment. As second point on the segment BC, F2 is selected, defined as intersection between the great-circle passing through BC and the great-circle passing through the h segment (see FIG. 11B). The length of the segments OE2 and OF2 is, due to the way they have been defined, always 180, and the bearing of segments OE2 and segment OF2 are π/2 and 0 respectively, corrected by the ROI's orientation, given by ψ. With this information, again the reverse of the Haversine formula are used to calculate the coordinates of E2 and F2. Once E, E2, F, F2 are known, the intersection between the great-circle passing through EE2 and the great circle passing through FF2 is calculated. This will give us the coordinates of vertex B.

For determining step 2, the Haversine formula may be used to calculate the length d of the segment OB. The Haversine formula takes as input the coordinates of the edges of the segment (O and B). The segments OC, OD and OA have the same length of OB, i.e. d. Then, the spherical law of cosines may be to calculate the bearing of OB. For this formula, the length of all segments of the triangle OEB is needed. OB and OE are known (equal to d and h/2 respectively), and EB is in turn calculated from E and B using the Haversine formula. The bearing is then calculated as follows (the term—ψ again accounts for the ROI's orientation.

$$\text{bearing} = \cos^{-1}\left(\frac{\cos(EB) - \cos\left(\frac{h}{2}\right) * \cos(d)}{\sin\left(\frac{h}{2}\right) * \sin(d)}\right) - \psi$$

For determining step 3, the coordinates of the remaining vertices (C, D, A) are calculated using the length d and the bearing and the reverse Haversine formula:

$$\varphi_C = a\sin(\sin(\varphi)*\cos(d/R) + \cos(\varphi)*\sin(d/R)*\cos(\pi - \text{bearing}))$$

$$\theta_C = \theta + a\tan2(\sin(-\psi)*\sin(d/R)*\cos(\varphi), \cos(d/R) - \sin(\varphi)*\sin(\varphi_C))$$

$$\varphi_D = a\sin(\sin(\varphi)*\cos(d/R) + \cos(\varphi)*\sin(d/R)*\cos(\pi + \text{bearing}))$$

$$\theta_D = \theta + a\tan2(\sin(-\psi)*\sin(d/R)*\cos(\varphi), \cos(d/R) - \sin(\varphi)*\sin(\varphi_D))$$

$$\varphi_A = a\sin(\sin(\varphi)*\cos(d/R) + \cos(\varphi)*\sin(d/R)*\cos(-\text{bearing}))$$

$$\omega_A = \theta + a\tan2(\sin(-\psi)*\sin(d/R)*\cos(\varphi), \cos(d/R) - \sin(\varphi)*\sin(\varphi_A))$$

The formulas used in this embodiment may be provided as part of standard libraries of common programming languages, such as Javascript. It is observed that, if the ROI's shape does not change in time, the length d and the bearing can be calculated only one time at the beginning (the bearing's angle possibly needing to be corrected if the ROI orientation ψ changes), thus making the calculation of the vertices B C D and A for the moving ROI faster (as they could all be computed using the reverse Haversine formula and hence only step 3—and step 2 in case the ROI's orientation changes—would need to be performed for all subsequent positions of that ROI).

The coordinates of E and F were calculated on the basis of the above-described steps. With a similar approach, the coordinates of H and G may be calculated as well.

The horizontal and vertical boundaries ($H_l$, $H_h$ and $V_l$ $V_h$ respectively) of the ROI are "the extreme" values of the ROI, i.e. max and min horizontal coordinate and max and min vertical coordinate. The max vertical coordinate is the biggest among the vertical coordinates of the ROI's vertices (ABCD) and of the centres of the ROI's edges (EFGH). The min vertical coordinate is the smallest among the vertical coordinates of the ROI's vertices (ABC) and of the centres of the ROI's edges (EFGH). The min and max horizontal boundaries are calculated in a similar way.

Thereafter, the tiles within the horizontal and vertical boundaries of the ROI can be determined. To identify these tiles, the coordinates of the centres of all tiles are reviewed and we select those tiles i for which it holds:

$H_l <= \theta_i <= H_h$, meaning that the centre has a yaw coordinate bigger than or equal to $H_l$, but smaller than or equal to $H_h$ $V_l <= \varphi_i <= V_h$, meaning that the centre has a pitch coordinate smaller than or equal to $V_l$, but bigger than or equal to $V_h$ This way, the client device may select tiles 1, 2, 4, 5, 7 and 8 for retrieval.

Figure 12A:
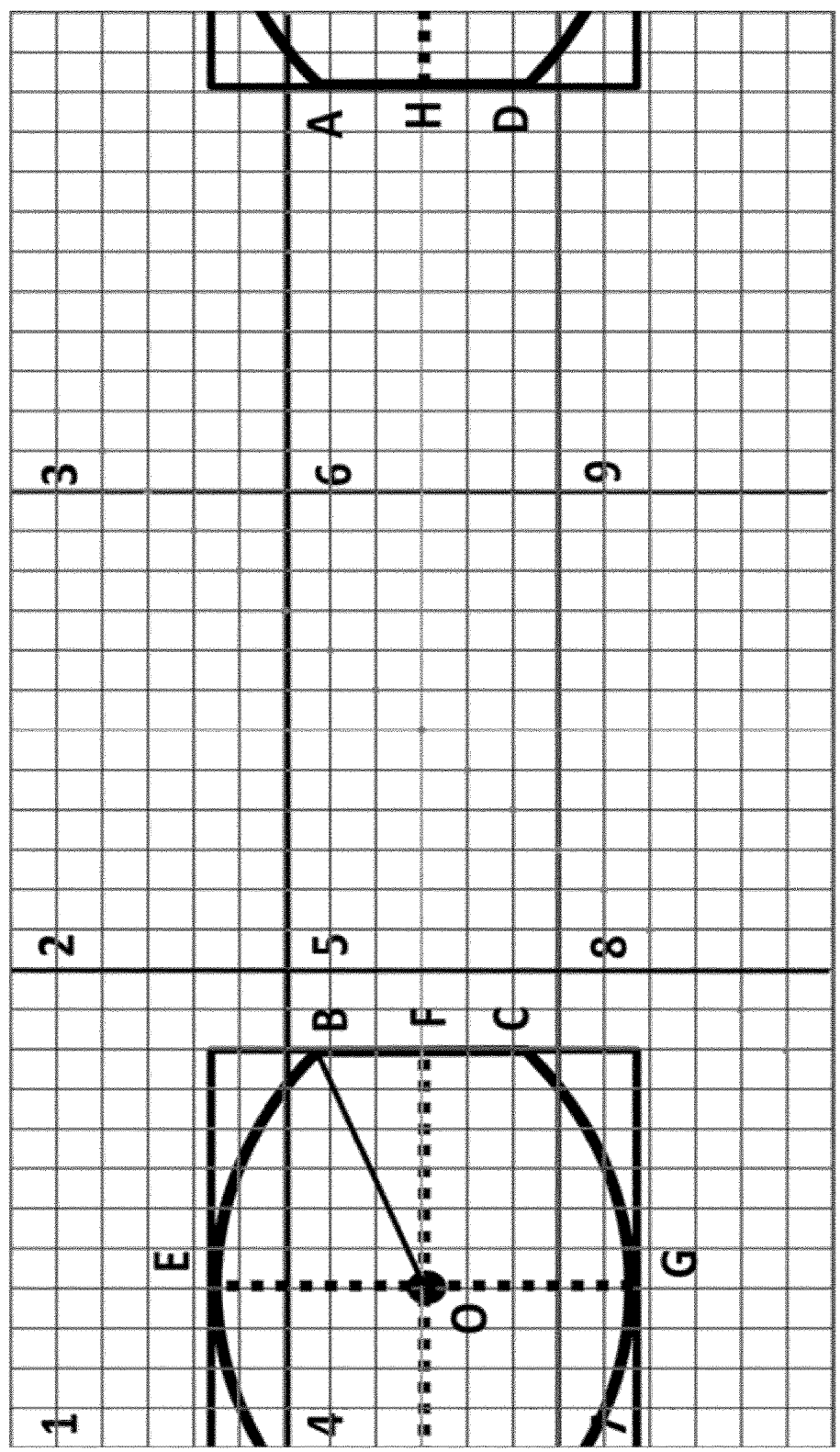
FIG. 12A-12B illustrates different 2D mappings of a ROI on a spherical surface.
Figure 12B:
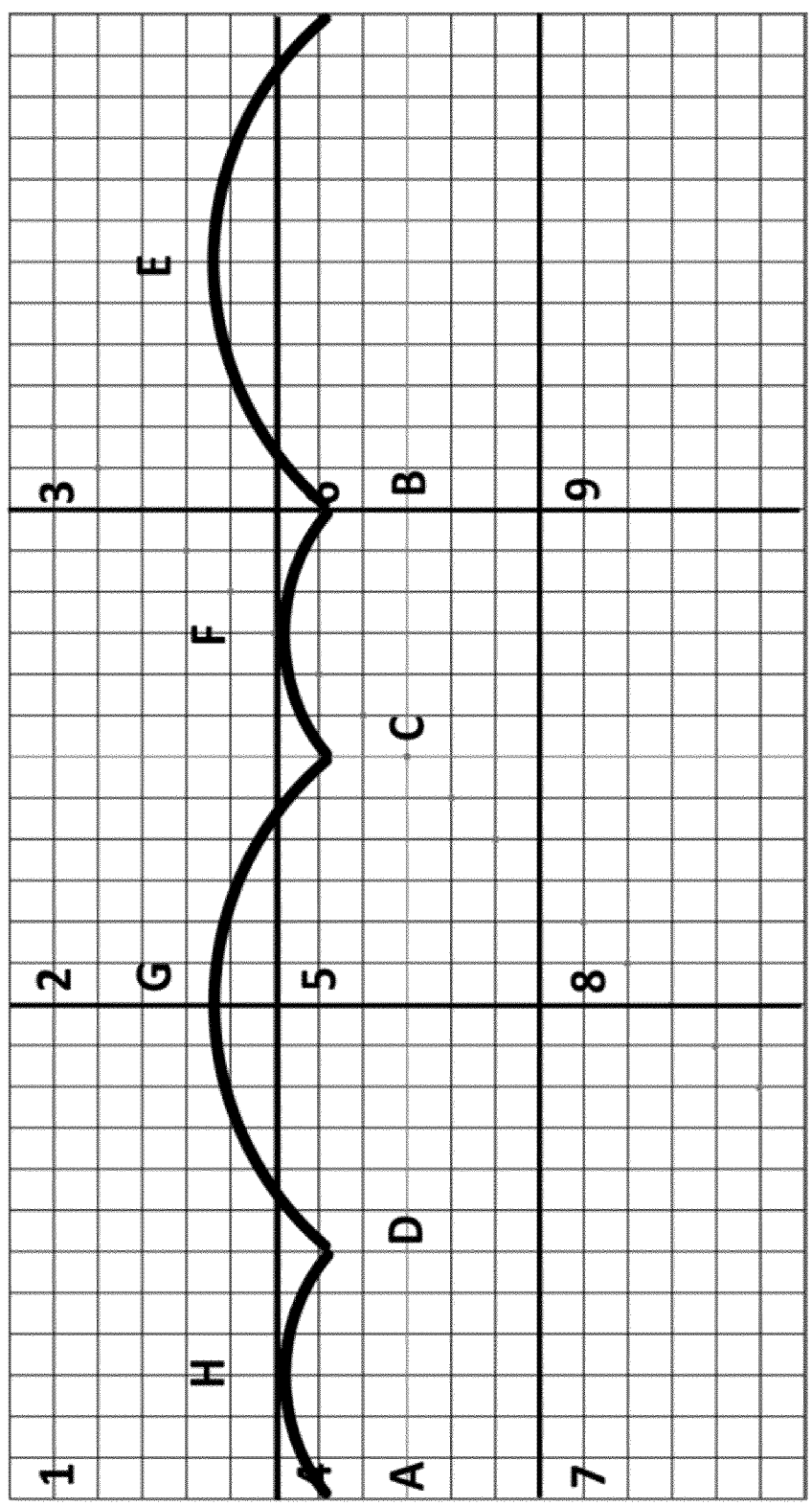

FIG. 12A depicts an example an off boundary ROI. In that case the ROI crosses the vertical boundary of the 2D mapping. This scenario may be easily dealt with when computing the ROI's vertices, since A and D will have horizontal coordinates larger than B and C. The situation may be resolved by creating two sets of horizontal boundaries:

Horizontal boundaries $1=(H_{l1}, H_{h1})=(0, \text{max horizontal coordinate among horizontal coordinates of B C and F})$ Horizontal boundaries $2=(H_{l2}, H_{h2})=(\text{min horizontal coordinate among horizontal coordinates of A H and F}, 360)$ FIG. 12B depicts an example wherein the ROI's centre is positioned at one of the poles, in this case the north pole. In this case, the representation of the ROI on the equirectangular mapping will look as in FIG. 12B.

This scenario can be easily identified either looking at the coordinates of the ROI's centre or by looking at the coordinates of the ROI's vertices, A B C and D, which will all have the same vertical coordinate. In this case, the horizontal and vertical boundaries are defined as follows:

$(H_l, H_h)=(0, 360)$
$(V_l, V_h)=(\text{vertical coordinate of vertex B}, 90)$

Figure 11B:
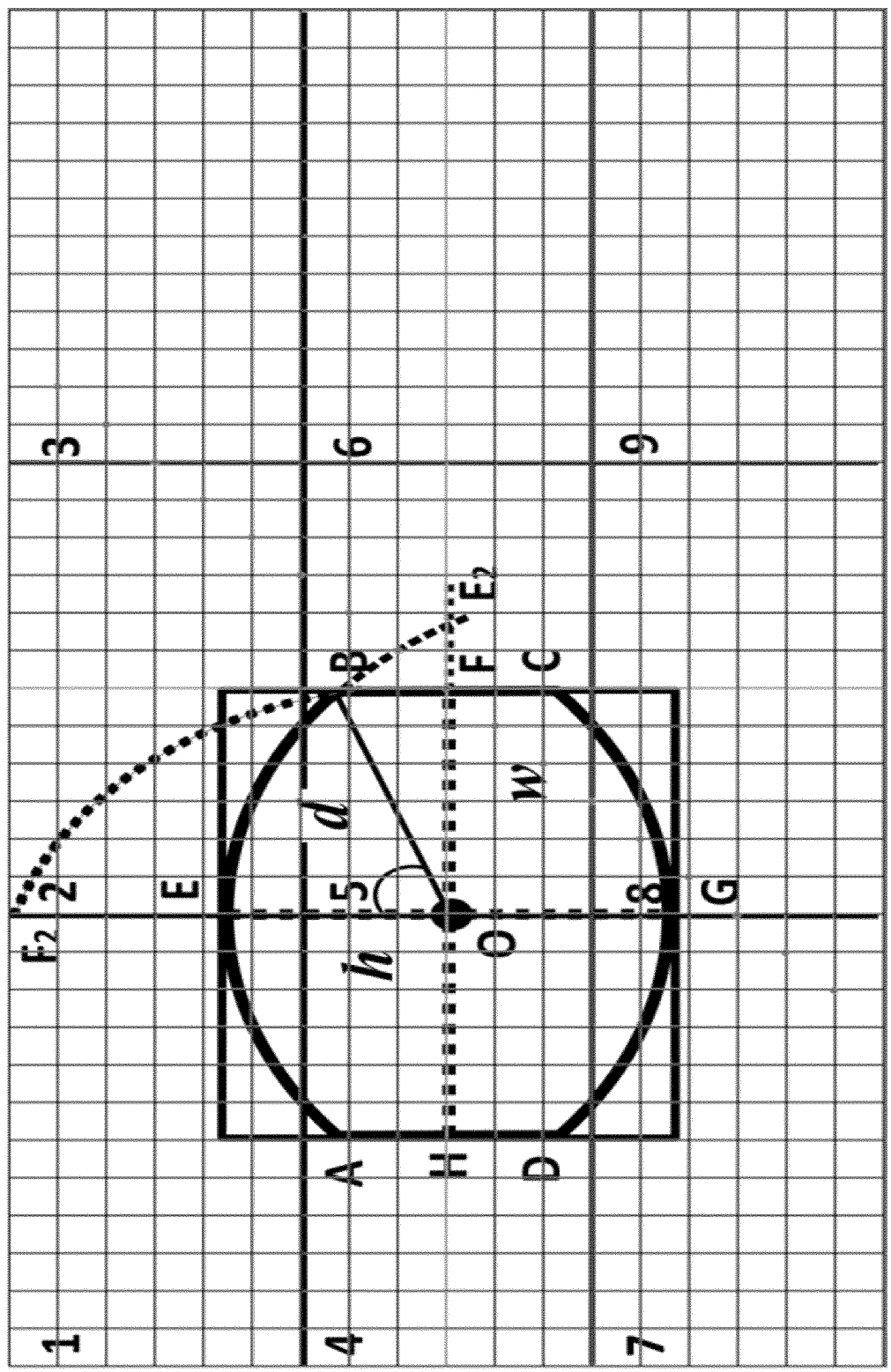

For the case of the ROI centered in the south pole, the horizontal and vertical boundaries are defined as follows:

$(H_l, H_h)=(0, 360)$
$(V_l, V_h)=(-90, \text{vertical coordinate of vertex B})$ Based in this information tiles may be selected in a similar way as described with reference to FIGS. 11A and 11B.

In a further example, tile may be selected on the basis of a non-rectangular ROI. In order to identify the location of a non-rectangular ROI, first the location of the bounding box needs to be determined. For the ROIs as defined with reference to FIG. 4A-4D, the bounding box may be determined as follows:

Circle: the boxing rectangle has the same center as the circle, and width and height both equal to 2r.

Ellipse: rectangle has same the center as the ellipse, and width and height equal to w and h respectively.

Generic polygon: from the coordinates of the various edges identify
the left-most yaw coordinate ($\theta_l$),
the right-most yaw coordinate ($\theta_r$)
the top pitch coordinate ($\varphi_t$)
the bottom pitch coordinate ($\varphi_b$)

wherein $\theta_l$ and $\theta_r$ correspond to the horizontal boundaries of the ROI and $\varphi_t$ and $\varphi_b$ correspond to the vertical boundaries.

Once the bounding box has been obtained, the client device may proceed in the same way as described with reference to FIGS. 11A and 11B. It is further noticed that, for the case of the generic polygon, the first step (identify the coordinates of the vertices and the horizontal/vertical boundaries) has already been computed when calculating the bounding box. Further, for the case of the generic polygon, the bounding box is an approximation, not taking the position of the centers of the polygon's edges in account.

Figure 13:
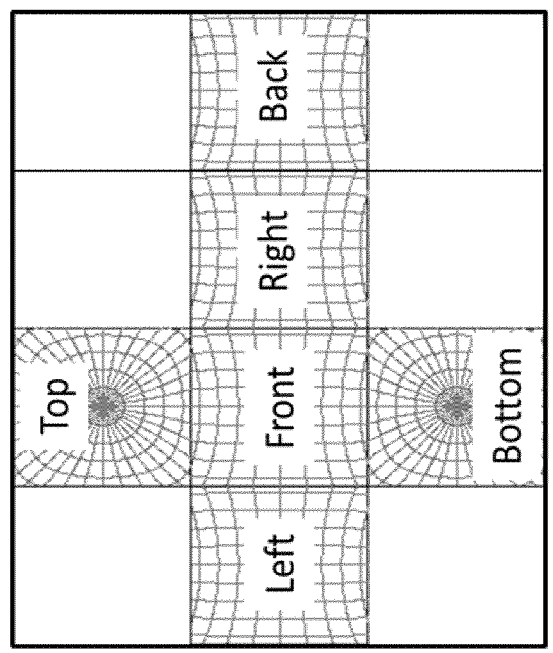
FIG. 13 illustrates a 2D cubic mapping scheme.
Figure 13:
Figure 13:
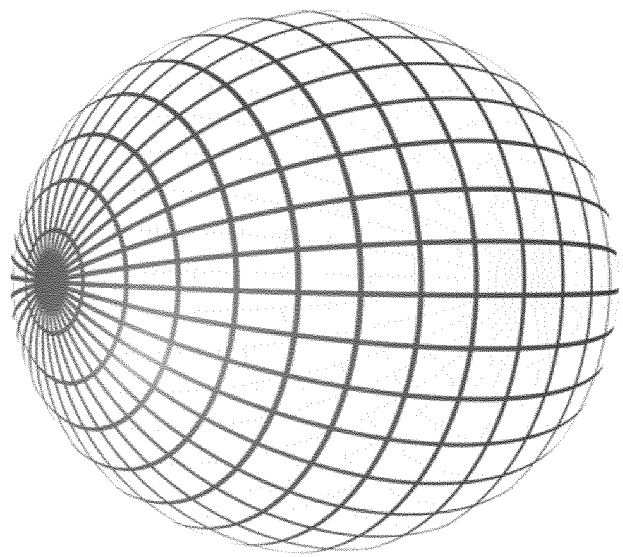

Instead of an equirectangular projection other types of projections, e.g. a cubic projection as depicted in FIG. 13, may also be used. FIG. 13 depicts a sphere represented on the 2D plane by a cube. In this embodiment, the cubic mapping is tiled in 12 tiles, of which only 6 hold content. It might be possible to rearrange the sides of the cube in order to occupy a smaller surface, e.g. a grid of 2 by 3 tiles, and therefore avoiding "empty" content in the bitstream.

In order to find the position of the ROI on the cubic mapping the following steps may be executed. Determine the vertices A B C and D as well as the centers of the ROI's edges E, F, G and H following the same steps as described above with reference to FIGS. 11A and 11B. Next, the position of the points within the cubic representation need to be found. Finally, the bounding box(es)—on the cubic representation—which include this ROI need to be determined.

The first steps includes identify the position of the vertices and the centers of the ROI's edges on the cubic mapping. A method may be used wherein first the spherical space is divided into four regions by the yaw angle:

Region 1: [0, 45], [315, 360]
Region 2: [45, 135]
Region 3: [135, 225]
Region 4: [225, 315]

Each of these regions may be projected to either one of the four lateral sides of the cube (namely, the middle part of each region) or the top side of the cube (namely, the top part of each region) or the bottom side of the cube (namely, the bottom part of each region). A point P will always be projected on the top side of the cube if its vertical coordinate $\varphi > 55$ degrees and will always be projected to the bottom side of the cube if $\varphi < -55$ degrees. This results into the following rule:

If $\varphi > 55$: then the point P is assigned to the top side of the cube

If $\varphi < -55$: then the point P is assigned to the bottom side of the cube

If $-55 \leq \varphi \leq 55$: then the point P is assigned to one of the 4 sides of the cube according to the regions defined above:
If $\theta$ belongs to Region 1, then the point P is assigned to the left side of the cube
If $\theta$ belongs to Region 2, then the point P is assigned to the front side of the cube
If $\theta$ belongs to Region 3, then the point P is assigned to the right side of the cube
If $\theta$ belongs to Region 4, then the point P is assigned to the back side of the cube Note that for points assigned to the lateral sides of the cube, there is still a chance that they actually belong to the top or bottom side. This situation may be verified in the next step.

Next, the cubic vector (x,y,z) relative to point P is calculate. The calculation of the cubic vector is dependent on the cube side assigned to point P:

| Assigned side | Calculation of cubic vector |
| --- | --- |
| Top | $x = \tan(\pi - \varphi) * \cos(\theta)$ <br> $y = \tan(\pi - \varphi) * \sin(\theta)$ <br> $z = 1$ |

-continued

| Assigned side | Calculation of cubic vector |
|---|---|
| Bottom | $x = -\tan(\pi - \varphi) * \cos(\theta)$ |
| | $y = -\tan(\pi - \varphi) * \sin(\theta)$ |
| | $z = -1$ |
| Left | $x = 1$ |
| | $y = \tan(\pi - \varphi)$ |
| | $z = \cot(\pi - \varphi)/\cos(\theta)$ |
| Front | $x = \tan(\theta - pi/2)$ |
| | $y = 1$ |
| | $z = \cot(\pi - \varphi)/\cos(\theta - pi/2)$ |
| Right | $x = -1$ |
| | $y = -\tan(\theta)$ |
| | $z = -\cot(\pi - \varphi)/\cos(\theta)$ |
| Back | $x = -\tan(\theta - 3*pi/2)$ |
| | $y = -1$ |
| | $z = \cot(\pi - \varphi)/\cos(\theta - 3*pi/2)$ |

When calculating the cubic vector relative to point P, a value z>1 for a point P assigned to one of the lateral sides of the cube, indicates that the point P has been mis-assigned, and actually belongs to the top. Likewise, if z<−1 P actually belongs to the bottom. In both cases, P is reassigned to the correct cube side and recalculate the cubic vector relative to P.

In the case in which the cube sides are not themselves divided into tiles, the calculation of the x and y components of the cubic vector can be omitted, since we only need to know in which cube side a point P falls, and for that calculating the z component of the cubic vector is enough.

Thereafter, the horizontal and vertical boundaries of the bounding box(es) may be calculated.

The steps in the previous paragraph are repeated for all interest points, i.e. the vertices of the ROI and the centres of the ROI's sides (A, B, C, D, E, F, G, H). Then all the cube sides in which these points reside are selected. These will be the tiles that the client device needs to request to the server.

In the case in which the sides of the cube are in turn divided into tiles, we can calculate the pixel coordinates of the interest points according to the following formula:

| Assigned side | Calculation pixel position |
|---|---|
| Top | $X = edge*(3 - x)/2$ |
| | $Y = edge*(1 + y)/2$ |
| Bottom | $X = edge*(3 - x)/2$ |
| | $Y = edge*(5 - y)/2$ |
| Left | $X = edge*(y + 1)/2$ |
| | $Y = edge*(3 - z)/2$ |
| Front | $X = edge*(x + 3)/2$ |
| | $Y = edge*(3 - z)/2$ |
| Right | $X = edge*(5 - y)/2$ |
| | $Y = edge*(3 - z)/2$ |
| Back | $X = edge*(7 - x)/2$ |
| | $Y = edge*(3 - z)/2$ | here edge is the length, in pixels, of the edge of a side of the cube.

Based on the pixel coordinates of the interest points, it can be inferred in which tiles they are in (in a similar way as done in the equirectangular embodiment). With a similar reasoning it can also be inferred the tiles that are in between these interest points.

The switching from Free mode to Directed mode and vice versa will be described hereunder in more detail.

To guarantee a good quality of service to the user, it is important to enable a seamless switch from free mode to directed mode and vice versa.

Two types of switches can be distinguished: "free switch" and "directed switch". Free switch means that the user may switch at any time between free mode and directed mode, while directed switch means that the user may switch between modes only at predefined times during the VR experience, e.g. when the VR content changes scene.

One important aspect in the case of "directed switch" is that the content provider knows at what moment in the media timeline the user will be switching, and therefore it can prepare the content for it.

Figure 14:
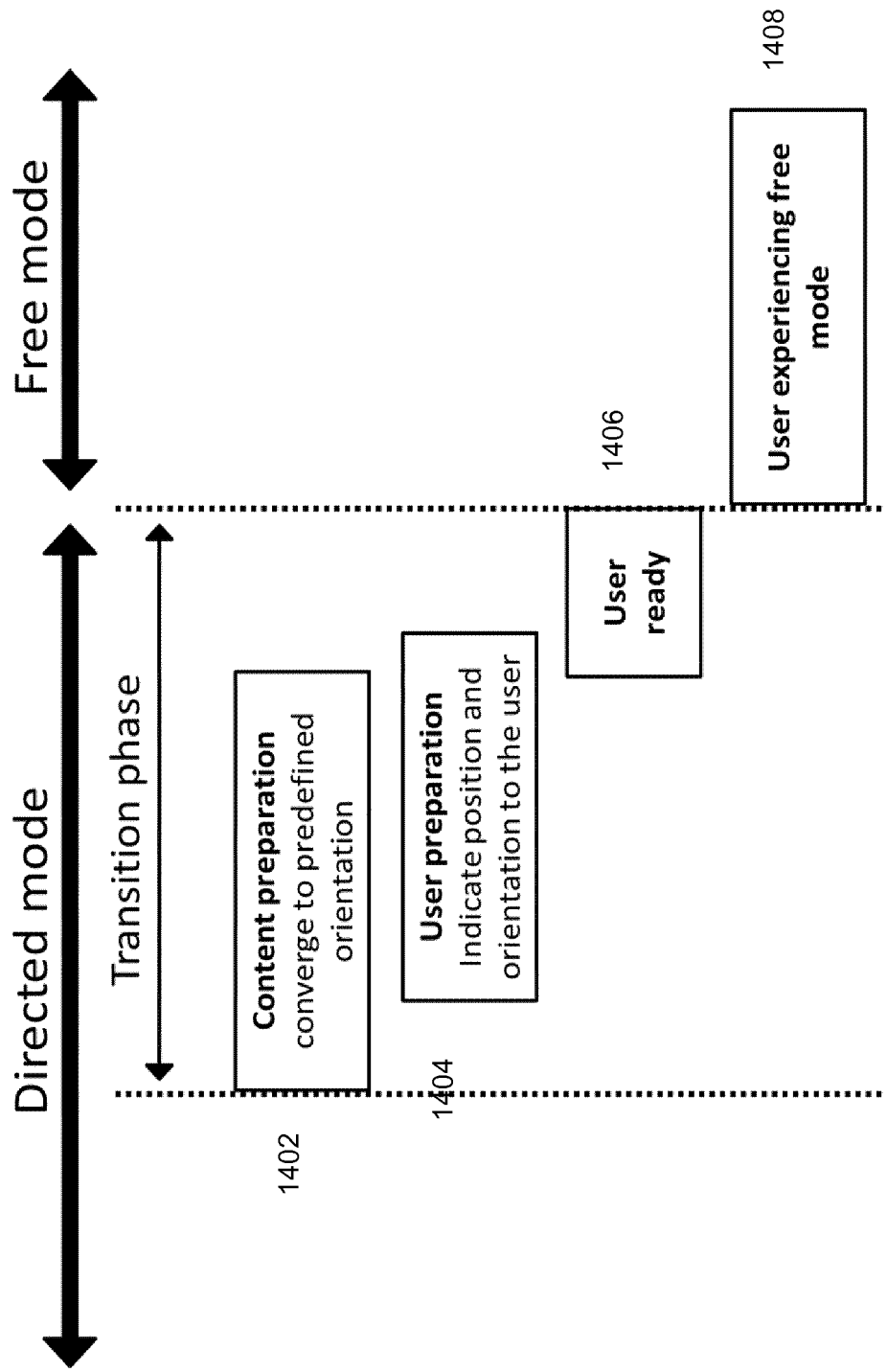
FIG. 14 depicts the transition of device operated in the directed mode to a device operated in the free mode.

FIG. 14 depicts the transition of device operated in the directed mode to a device operated in the free mode. When the VR media is approaching the end of a Directed mode scene, a transition phase will be executed.

During this transition phase, the content provider may prepare the content (step 1402), in order to display, on the virtual or real displays, the content at predefined values of yaw and roll angles (e.g. 0 and 0). At the same time, the user may be asked to take a particular position and head orientation in the virtual world (step 1404), in order to be consistent with the position and orientation of the content (e.g. with the head located in front of the display, where the hypothetical projector would stand, and with the yaw and roll angles of the head equal to the ones of the content, e.g. yaw=0 and roll=0).

With the user's position and orientation consistent with the content's position and orientation on the sphere, the actual transition to free mode can happen (steps 1406 and 1408). The user may trigger the transition via a user interface, e.g. pressing a button, or the transition may be automatically started once the user is in the correct position and orientation. The transition may feature a slow fading off of the virtual theatre (or view of the real world) with the virtual, immersive content taking its place. The length of the transition phase might be decided by the content provider, or the client application, or even set by the user. After the transition, user's body and head movements will decide the VR content being projected.

In the same why, the user may switch from the Free mode to the Directed mode. When the VR media is approaching the beginning of a scene that can be experienced in Directed mode, a transition phase will be executed.

During this transition phase, the content provider will have the directed content available at predefined values of yaw and roll angles (e.g. 0 and 0). At the same time, the user may be asked to take a particular position and head orientation in the virtual world, in order to be consistent with the position and orientation of the directed content to be displayed on the virtual or real display (e.g. with the head located at the centre of the virtual world, where the camera that took the directed video stood, and with the yaw and roll angles of the head equal to the ones of the content, e.g. yaw=0 and roll=0).

With the user's position and orientation consistent with the content's position and orientation on the sphere, the actual transition to directed mode can happen. The user might trigger the transition by pressing a button or the transition may be automatically started once the user is in the correct position and orientation. The transition may feature a slow fading off of the immersive, virtual content, with the virtual theatre (or view of the real world) taking its place. The length of the transition phase might be decided by the content provider, or the client application, or even set by the user. After the transition, user's body and head movements will not any more have influence on the VR content being projected.

In free switching case, the user may switch between directed and free modes at any moment in the media timeline, hence requiring some additional steps during the transition phase, to enable a transition as smooth as possible.

When the user is currently experiencing the video stream in directed mode and indicates the intention to switch to free mode, a transition phase will be executed.

During the transition phase, the user may be asked to take a particular position and head orientation in the virtual world, such that the real or virtual display is exactly in front of her (e.g. with the head located at the center of the virtual world, where the camera that took the directed video stood, and with the yaw and roll angles of the head at rest, e.g. yaw=0 and roll=0).

Once the user's position and orientation have been adjusted, the actual transition to free mode can happen. The user might trigger the transition by pressing a button or the transition may be automatically started once the user is in the correct position and orientation. The transition may feature a translation movement of the content to the viewpoint coordinates with yaw and roll at rest (or whatever the yaw and roll coordinates of the user's head currently are), and a slow fading off of the virtual theatre (or view of the real world) with the virtual, immersive content taking its place. The length of the transition phase might be decided by the content provider, or the client application, or even set by the user.

In the case in which preparing the user for the transition is not possible, during the transition phase the client application may need to also perform a zoom-in or out, next to the content translation and fading out of the non-immersive elements. After the transition, user's body and head movements will decide the VR content being projected.

When the user is currently experiencing the video stream in free mode and indicates the intention to switch to directed mode, a transition phase will be executed.

During the transition phase, the user may be asked to take a particular position and head orientation in the virtual world, in order to be consistent with the position and orientation of the directed content to be displayed on the virtual or real display (e.g. with the head located in front of the display, where the hypothetical projector would stand, and with the yaw and roll angles of the head at rest, e.g. yaw=0 and roll=0).

Once the user's position and orientation have been adjusted, the actual transition to directed mode can happen. The user might trigger the transition by pressing a button or the transition may be automatically started once the user is in the correct position and orientation. The transition may feature a translation movement of the content to the viewpoint coordinates with yaw and roll equal to those of the directed content to be displayed, and a slow fading off of the immersive, virtual content, with the virtual theatre (or view of the real world) taking its place. The length of the transition phase might be decided by the content provider, or the client application, or even set by the user.

In the case in which preparing the user for the transition is not possible, during the transition phase the client application may need to also perform a zoom-in or out, next to the content translation and fading out of the non-immersive elements.

After the transition, user's body and head movements will not any more have influence on the VR content being projected.

When offering live content, user may join the program at any point in time. However, it is very likely that the most interesting view of the whole scene change over time as decided by the content creator. As a result, the content may want to indicate to the client device the position in the sphere it should start rendering and starting at an arbitrary position. To this end, the 3D Spherical ROI coordinate may also be used by the application to define the initial viewport when tuning in a live content. Similarly, when an user seeks into an on-demand content, the application may also leverage this information in order to present to the user the most interesting view as defined by the content creator.

Figure 15:
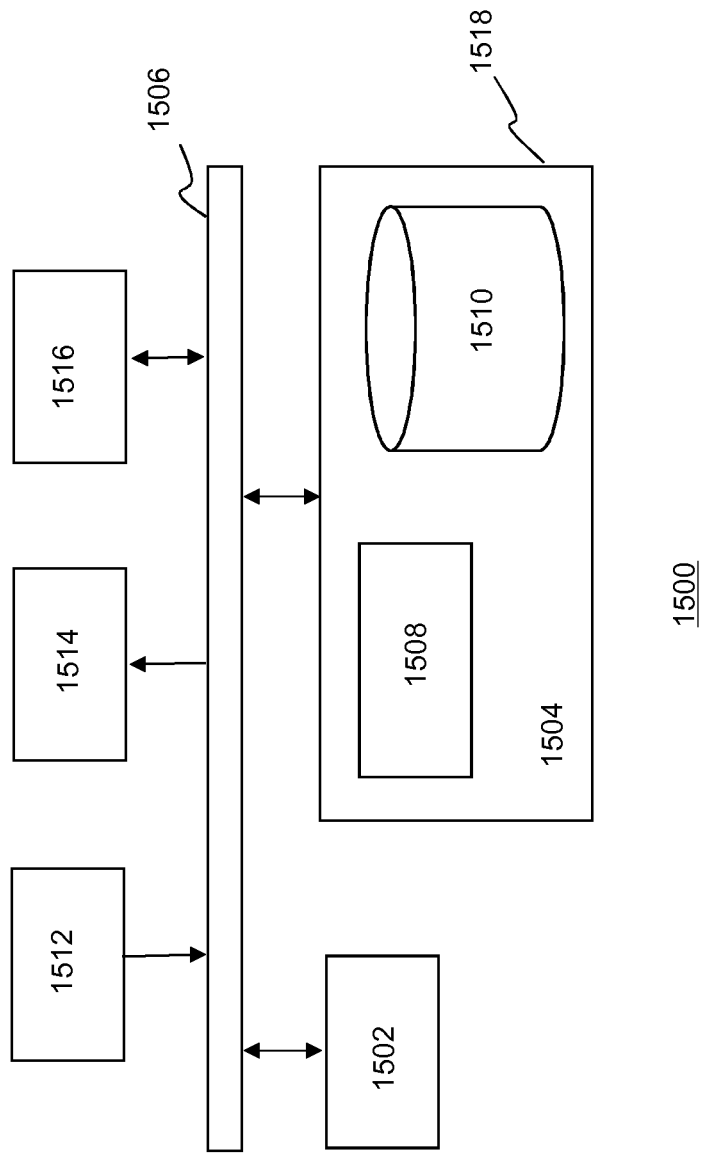
FIG. 15 depicts a block diagram illustrating an exemplary data processing system that may be used with embodiments described in this disclosure.

FIG. 15 is a block diagram illustrating an exemplary data processing system that may be used as described in this disclosure. Data processing system 1500 may include at least one processor 1502 coupled to memory elements 1504 through a system bus 1506. As such, the data processing system may store program code within memory elements 1504. Further, processor 1502 may execute the program code accessed from memory elements 1504 via system bus 1506. In one aspect, data processing system may be implemented as a computer that is suitable for storing and/or executing program code. It should be appreciated, however, that data processing system 1500 may be implemented in the form of any system including a processor and memory that is capable of performing the functions described within this specification.

Memory elements 1504 may include one or more physical memory devices such as, for example, local memory 1508 and one or more bulk storage devices 1510. Local memory may refer to random access memory or other non-persistent memory device(s) generally used during actual execution of the program code. A bulk storage device may be implemented as a hard drive or other persistent data storage device. The processing system 1500 may also include one or more cache memories (not shown) that provide temporary storage of at least some program code in order to reduce the number of times program code must be retrieved from bulk storage device 1510 during execution.

Input/output (I/O) devices depicted as input device 1512 and output device 1514 optionally can be coupled to the data processing system. Examples of input device may include, but are not limited to, for example, a positional tracker, a keyboard, a pointing device such as a mouse, a touch screen or the like. Examples of output device may include, but are not limited to, for example, a monitor or (head-mounted) display, speakers, or the like. Input device and/or output device may be coupled to data processing system either directly or through intervening I/O controllers. A network adapter 1516 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1550.

As pictured in FIG. 15, memory elements 1504 may store an application 1518. It should be appreciated that data processing system 1500 may further execute an operating system (not shown) that can facilitate execution of the application. Application, being implemented in the form of executable program code, can be executed by data processing system 1500, e.g., by processor 1502. Responsive to executing application, data processing system may be configured to perform one or more operations to be described herein in further detail.

In one aspect, for example, data processing system 1500 may represent a client data processing system. In that case, application 1518 may represent a client application that, when executed, configures data processing system 1500 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1518, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for processing spherical video data comprising:
   a client apparatus receiving or generating region of interest (ROI) information associated with a ROI in a spherical representation of video data, the ROI having a center, an orientation and a boundary on a spherical surface, the spherical representation defining an image view of spherical video data on a spherical surface on the basis of a spherical coordinate system, the ROI information including a spherical ROI coordinate associated with a position of the ROI, wherein the spherical ROI coordinate includes a yaw, pitch, and roll angle, the yaw and pitch angle indicating the center of the ROI and the roll angle indicating the orientation of the ROI, the ROI information further comprising parameters representing the width of the ROI in degrees of arc and the height of the ROI in degrees of arc, wherein the height is defined as a segment on a first great-circle passing through the center of the ROI and having a bearing equal to the pitch angle, and wherein the width is defined as a segment that is located on a second great-circle passing through the center of the ROI, wherein the second great-circle is substantially orthogonal to the first great-circle;
   the client apparatus receiving a manifest file comprising one or more tile stream identifiers for identifying one or more tile streams, each tile stream comprising transformed spherical video data of a tile on the spherical surface, the transformed spherical video data resulting from transforming the spherical video data, the transforming including at least a projection of the spherical video data onto a planar surface; each tile defining a subpart on the spherical surface, the manifest file further comprising spatial description information for signaling the client apparatus information on the position of the tiles on the spherical surface;
   the client apparatus receiving projection information for signaling the client apparatus about the type of projection that is used for projection of the spherical video data onto the planar surface; and,
   the client apparatus receiving and/or generating boundary information for defining the boundary of the ROI on the basis of the spherical ROI coordinate and the parameters representing the width of the ROI in degrees of arc and the height of the ROI in degrees of arc, the boundary having a shape that is constant for each position on the spherical surface and defining a ROI area; and, using the ROI area for selecting one or more tile streams on the basis of the spatial description information and the projection information, wherein each of the selected tile streams defines a tile on the sphere that overlaps with the ROI area.

2. Method according to claim 1 wherein the boundary information comprises one or more further ROI coordinates, the ROI coordinate and the one or more further ROI coordinates defining vertices of a spherical polygon, the boundary of the spherical polygon being defined by a line segment over the spherical surface between two vertices, the line segment being part of a great circle or a small circle of said sphere.

3. Method according to claim 1 wherein the boundary information comprises one or more further ROI coordinates, wherein the one or more further ROI coordinates define one or more points on the boundary of the ROI.

4. Method according to claim 1 wherein the projection information is comprised in the manifest file, the projection information including a projection descriptor value for identifying the type of projection that is used for projection of the spherical video data onto the planar surface.

5. Method according to claim 1 wherein the manifest file further comprises at least one ROI stream identifier, the ROI stream identifier identifying a data stream comprising a sequence of temporally ordered spherical ROI coordinates, the temporally ordered spherical ROI coordinates defining the position of the ROI as a function of time, and optionally, the manifest file further comprising ROI area information defining the shape of the ROI.

6. Method according to claim 5 wherein the manifest file further comprises ROI data format information for signaling the client apparatus about the data format of the ROI coordinates in the ROI stream.

7. Method according to claim 1 wherein receiving the ROI information includes:
   receiving a data stream comprising spherical ROI coordinates, the ROI coordinates defining the position of the ROI as a function of time; and, optionally, the data stream comprising ROI area information defining the boundary and/or the shape of the ROI.

8. Method according to claim 1 wherein the client apparatus uses the projection information for selecting a tile selection algorithm, the tile section algorithm being configured to select one or more tiles that have overlap with the ROI.

9. Method according to claim 1 wherein selecting one or more tile streams further comprises:
   using the projection information to transform the ROI area into a 2D projected ROI area on a flat plane,
   using the 2D projected ROI area in the selection of the one or more tile streams defining one or more tiles that overlap with the ROI area.

10. Method according to claim 1 wherein generating region of interest (ROI) information includes:
    receiving sensor information indicative of the head, eye and/or body movements of a user;
    transforming the sensor information into a spherical ROI coordinate.

11. Method according to claim 1 wherein an adaptive streaming protocol is used for processing and streaming the spherical video data, and, optionally, the ROI information.

12. A client device for processing spherical video data comprising:
    a computer readable storage medium having at least part of a program embodied therewith, the computer readable storage medium comprising a manifest file; and,
    the computer readable storage medium having computer readable program code embodied therewith, and a processor coupled to the computer readable storage medium, wherein responsive to executing the computer readable program code, the processor is configured to perform executable operations comprising:
    receiving or generating region of interest (ROI) information associated with a ROI in a spherical representation of video data, the ROI having a center, an orientation and a boundary on a spherical surface, the spherical representation defining an image view of spherical video data on a spherical surface on the basis of a spherical coordinate system, the ROI information including a spherical ROI coordinate associated with a position of the ROI, wherein the spherical ROI coordinate includes a yaw, pitch, and roll angle, the yaw and pitch angle indicating the center of the ROI and the roll angle indicating the orientation of the ROI, the ROI information further comprising parameters representing the width of the ROI in degrees of arc and the height of the ROI in degrees of arc, wherein the height is defined as a segment on a first great-circle passing through the center of the ROI and having a bearing equal to the pitch angle, and wherein the width is defined as a segment that is located on a second great-circle passing through the center of the ROI, wherein the second great-circle is substantially orthogonal to the first great-circle;
    receiving a manifest file comprising one or more tile stream identifiers for identifying one or more tile streams, each tile stream comprising transformed spherical video data of a tile on the spherical surface, the transformed spherical video data resulting from transforming the spherical video data, the transforming including at least a projection of the spherical video data onto a planar surface; each tile defining a subpart on the spherical surface, the manifest file further comprising spatial description information for signaling the client apparatus information on the position of the tiles on the spherical surface;
    receiving projection information for signaling the client apparatus about the type of projection that is used for transforming spherical video data;
    receiving and/or generating boundary information for defining the boundary of the ROI on the basis of the spherical ROI coordinate and the parameters representing the width of the ROI in degrees of arc and the height of the ROI in degrees of arc, the boundary having a shape that is constant for each position on the spherical surface and defining a ROI area; and, using the ROI area for selecting one or more tile streams on the basis of the spatial description information and the projection information, wherein each of the selected tile streams defines a tile on the sphere that overlaps with the ROI area.

13. Non-transitory computer-readable storage media comprising a manifest file for a client device, said client device being configured to process spherical video data on the basis of the information in the manifest file, said manifest file comprising computer readable data, the computer readable data comprising:
    one or more stream identifiers for identifying one or more moving view video streams, a moving view video stream comprising spherical video data associated with a predetermined ROI;
    one or more ROI stream identifiers, a ROI stream identifier defining a data stream comprising spherical ROI coordinates, the spherical ROI coordinates defining the position of a predetermined ROI of a moving view video stream; and, optionally,
    ROI data format information for signaling the client apparatus about the data format of the ROI coordinates in the data stream; and,
    one or more tile stream identifiers for identifying one or more tile streams, each tile stream comprising transformed spherical video data of a tile on the spherical surface, the transformed spherical video data resulting from transforming the spherical video data, the transforming including at least a projection of the spherical video data onto a planar surface; each tile defining a subpart on the spherical surface, the manifest file further comprising spatial description information for signaling the client apparatus information on the position of the tiles on the spherical surface and comprising ROI area information, wherein the ROI area information comprises parameters representing the width of the ROI in degrees of arc and the height of the ROI in degrees of arc, wherein the height is defined as a segment on a first great-circle passing through the center of the ROI and having a bearing equal to the pitch angle, and wherein the width is defined as a segment that is located on a second great-circle passing through the center of the ROI, wherein the second great-circle is substantially orthogonal to the first great-circle.

14. Computer program product comprising software code portions configured for, when run in the memory of a computer, executing the method steps according to claim 1.

15. Method according to claim 1 wherein the ROI boundary defines a rectangular spherical polygon.

16. Method according to claim 1 wherein the ROI boundary defines a square spherical polygon.

17. Method according to claim 1 wherein the ROI boundary defines a spherical ellipse.

* * * * *